US011265441B2

(12) United States Patent
Omagari et al.

(10) Patent No.: US 11,265,441 B2
(45) Date of Patent: Mar. 1, 2022

(54) INFORMATION PROCESSING APPARATUS TO PROCESS CAPTURED IMAGE DATA, INFORMATION PROCESSING METHOD, AND STORAGE MEDIUM

(71) Applicant: CANON KABUSHIKI KAISHA, Tokyo (JP)

(72) Inventors: Yuki Omagari, Tokyo (JP); Hiroyuki Sakai, Kanagawa (JP); Yuki Ishida, Kanagawa (JP); Tomohiro Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/142,337

(22) Filed: Jan. 6, 2021

(65) Prior Publication Data

US 2021/0211555 A1    Jul. 8, 2021

(30) Foreign Application Priority Data

Jan. 6, 2020  (JP) .............................. JP2020-000318

(51) Int. Cl.
*H04N 1/387* (2006.01)
*H04N 1/32* (2006.01)
*H04N 1/00* (2006.01)

(52) U.S. Cl.
CPC ....... *H04N 1/3878* (2013.01); *H04N 1/00718* (2013.01); *H04N 1/00721* (2013.01); *H04N 1/00779* (2013.01); *H04N 1/32144* (2013.01)

(58) Field of Classification Search
CPC ............. H04N 1/3878; H04N 1/00718; H04N 1/00721; H04N 1/00779; H04N 1/32203; H04N 1/32144; G06T 1/0021; G06T 2201/0052

USPC .......................................................... 382/289
See application file for complete search history.

(56) References Cited

U.S. PATENT DOCUMENTS

| | | |
|---|---|---|
| 4,918,541 A | 4/1990 | Ishida et al. |
| 5,060,280 A | 10/1991 | Mita et al. |
| 5,493,415 A | 2/1996 | Mita et al. |
| 5,677,725 A | 10/1997 | Honbo et al. |
| 5,680,486 A | 10/1997 | Mita et al. |
| 5,714,985 A | 2/1998 | Kawamura et al. |
| 5,848,185 A | 12/1998 | Koga et al. |
| 5,905,579 A | 5/1999 | Katayama et al. |
| 6,556,711 B2 | 4/2003 | Koga et al. |

(Continued)

FOREIGN PATENT DOCUMENTS

JP    2004-015396 A    1/2004

*Primary Examiner* — Gabriel I Garcia
(74) *Attorney, Agent, or Firm* — Venable LLP

(57) ABSTRACT

The present disclosure provides a technique to obtain a tilt state occurring between an image capturing unit and a print image having additional information embedded in it without using the visible image. In the technique, an image of a print image in which additional information having a specified frequency characteristic is embedded is captured using an image capturing unit to obtain captured image data. A frequency analysis is performed on partial image data corresponding to a specified area in the obtained captured image data, to obtain distance information on a distance between the specified area and the image capturing unit. Inclination information indicating a state of a relative inclination between the image capturing unit and the print image is obtained based on this distance.

18 Claims, 22 Drawing Sheets

(56) References Cited

U.S. PATENT DOCUMENTS

| | | |
|---|---|---|
| 6,661,838 B2 | 12/2003 | Koga et al. |
| 8,184,337 B2 | 5/2012 | Sakai |
| 8,718,359 B2 | 5/2014 | Sakai et al. |
| 9,189,681 B2 | 11/2015 | Kunieda et al. |
| 9,214,027 B2 | 12/2015 | Sumi et al. |
| 9,275,270 B2 | 3/2016 | Suwa et al. |
| 9,602,691 B2 | 3/2017 | Miyake et al. |
| 9,648,198 B2 | 5/2017 | Ishida et al. |
| 9,727,951 B2 | 8/2017 | Sakai et al. |
| 9,769,380 B2 | 9/2017 | Iguchi et al. |
| 10,013,395 B2 | 7/2018 | Kajiwara et al. |
| 2004/0046896 A1 | 3/2004 | Koga et al. |
| 2011/0149084 A1* | 6/2011 | Beck .................... A61B 1/0646 |
| | | 348/187 |
| 2019/0005364 A1* | 1/2019 | Omagari ............... G06F 3/1243 |
| 2020/0311856 A1* | 10/2020 | Inoue ........................ G06T 7/70 |

* cited by examiner

```
01 : <svg xmlns="http://www.w3.org/2000/svg" xmlns:xlink="http://www.w3.org/1999/xlink"
     width="300" height="400"  viewBox="0 0 300 400">
02 :   <image width="300" height="400" x="0" y="0" xlink:href="image.jpg"></image>
03 : </svg>
```

FIG.8A

```
01 : <svg xmlns="http://www.w3.org/2000/svg" xmlns:xlink="http://www.w3.org/1999/xlink"
     width="950" height="1400"  viewBox="0 0 950 1400">
02 :   <image width="950" height="1400" x="0" y="0" xlink:href="image.jpg"></image>
03 : </svg>
```

FIG.8B

```
01 : <?xml version="1.0" ?>
02 : <content>
03 :   <papersize>89x127mm</papersize>
04 :   <papertype>photographic</papertype>
05 :   <printquality>normal</printquality>
06 :   <imageData>
07 :     <width>950</width>
08 :     <height>1400</height>
09 :     <format>JPEG</format>
10 :     <data>JPEG DATA</data>
11 :   </imageData>
12 : </content>
```

FIG.10

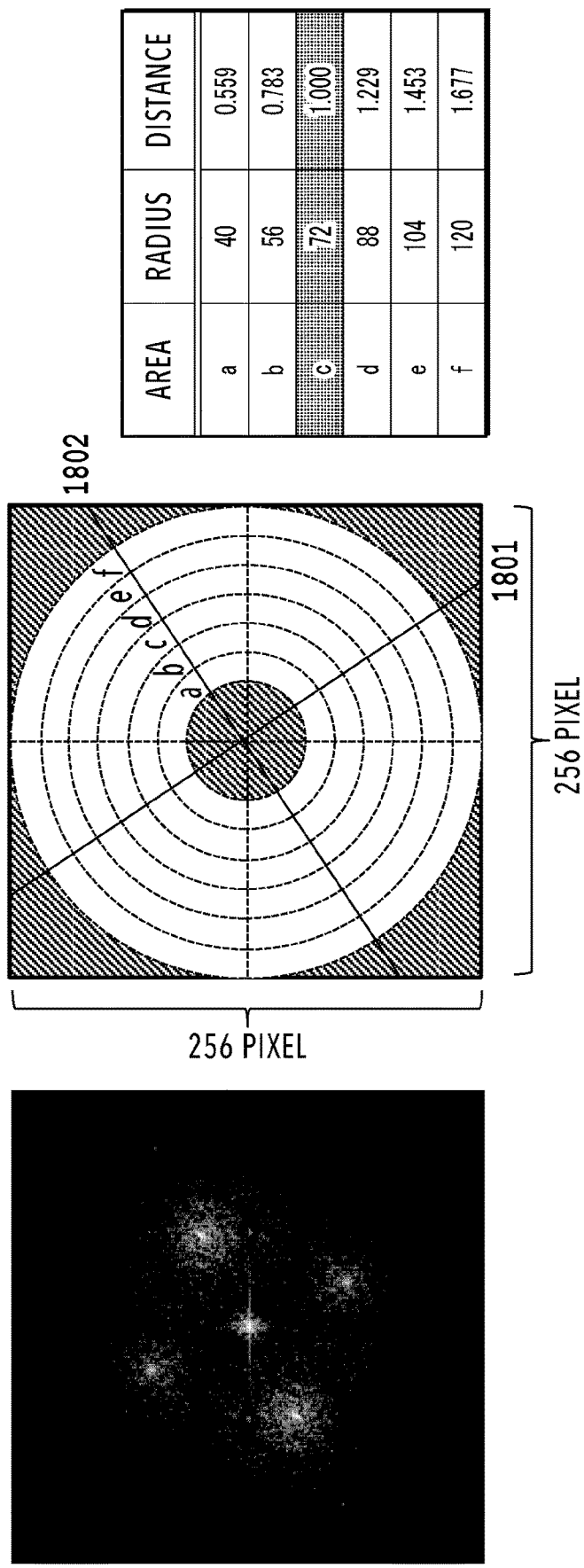

INFORMATION PROCESSING APPARATUS TO PROCESS CAPTURED IMAGE DATA, INFORMATION PROCESSING METHOD, AND STORAGE MEDIUM

BACKGROUND OF THE INVENTION

Field of the Invention

The present disclosure relates to a technique to process captured image data of a print image.

Description of the Related Art

There are currently known techniques in which an image of a print image in which additional information is embedded using a digital watermarking technique is captured by an image capturing unit, and the additional information is read from the printed image data.

Japanese Patent Laid-Open No. 2004-15396 discloses a technique to read an image using an image capturing device integrated in a portable terminal such as a smartphone and then extract additional information from the read image. This document discloses detecting the enlargement or reduction and the rotation of a print image to be captured to achieve high-robustness in reading additional-information.

SUMMARY OF THE INVENTION

In capturing an image of a print image with an image capturing unit of a portable terminal such as a smartphone, there are cases in which a three-dimensional inclination (tilt) occurs between the printed product and the camera. In the method disclosed in Japanese Patent Laid-Open No. 2004-15396, it is difficult to obtain appropriate image-capturing data in the case where there is a tilt between the terminal and the print image.

In light of the above issue, an object of the present disclosure is to provide a technique to obtain a tilt state occurring between an image capturing unit and a print image having additional information embedded in it.

The present disclosure relates to an information processing method including: a first obtaining step of, using an image capturing unit, capturing an image of a captured image in which additional information having a specified frequency characteristic is embedded, to obtain captured image data; a second obtaining step of performing a frequency analysis on partial image data of the captured image data, the partial image data corresponding to a specified area of the captured image, to obtain distance information on a distance between the area and the image capturing unit; and a third obtaining step of obtaining inclination information indicating a state of a relative inclination between the image capturing unit and the print image, based on the distance information.

The present disclosure makes it possible to obtain a tilt state occurring between an image capturing unit and a print image having additional information embedded in it.

Further features of the present invention will become apparent from the following description of exemplary embodiments with reference to the attached drawings.

BRIEF DESCRIPTION OF THE DRAWINGS

FIGS. 8A and 8B are diagrams illustrating description examples of SVG;

FIG. 10 is a diagram illustrating an example of a print command;

FIGS. 18A to 18C are diagrams illustrating an FFT image and an example of obtaining distance information based on the FFT image;

DESCRIPTION OF THE EMBODIMENTS

Hereinafter, embodiments of the present disclosure will be described as examples in detail with reference to the attached drawings. The constituents described in the following embodiments are merely examples, and hence those are not intended to limit the scope of the present disclosure only to those examples.

First Embodiment

<Overview of Image Processing System>

In the present embodiment, an image processing apparatus (information processing apparatus) includes an application capable of embedding and reading additional information. This application creates content (image data) having additional information embedded in it. The image processing apparatus generates print data from the created content and transmits the print data to the printer. The printer performs printing using the print data and thus outputs a print image having the additional information embedded in it.

The term "additional information" in the present embodiment means information embedded in a printed product. The additional information is embedded (added, or this operation is sometimes referred to as "multiplexed") into a print image such that the additional information is visually unnoticeable. The additional information may also be called multiplexing information, watermark information, or embedding information in some cases.

<Hardware Configuration of Image Processing Apparatus>

Figure 1:
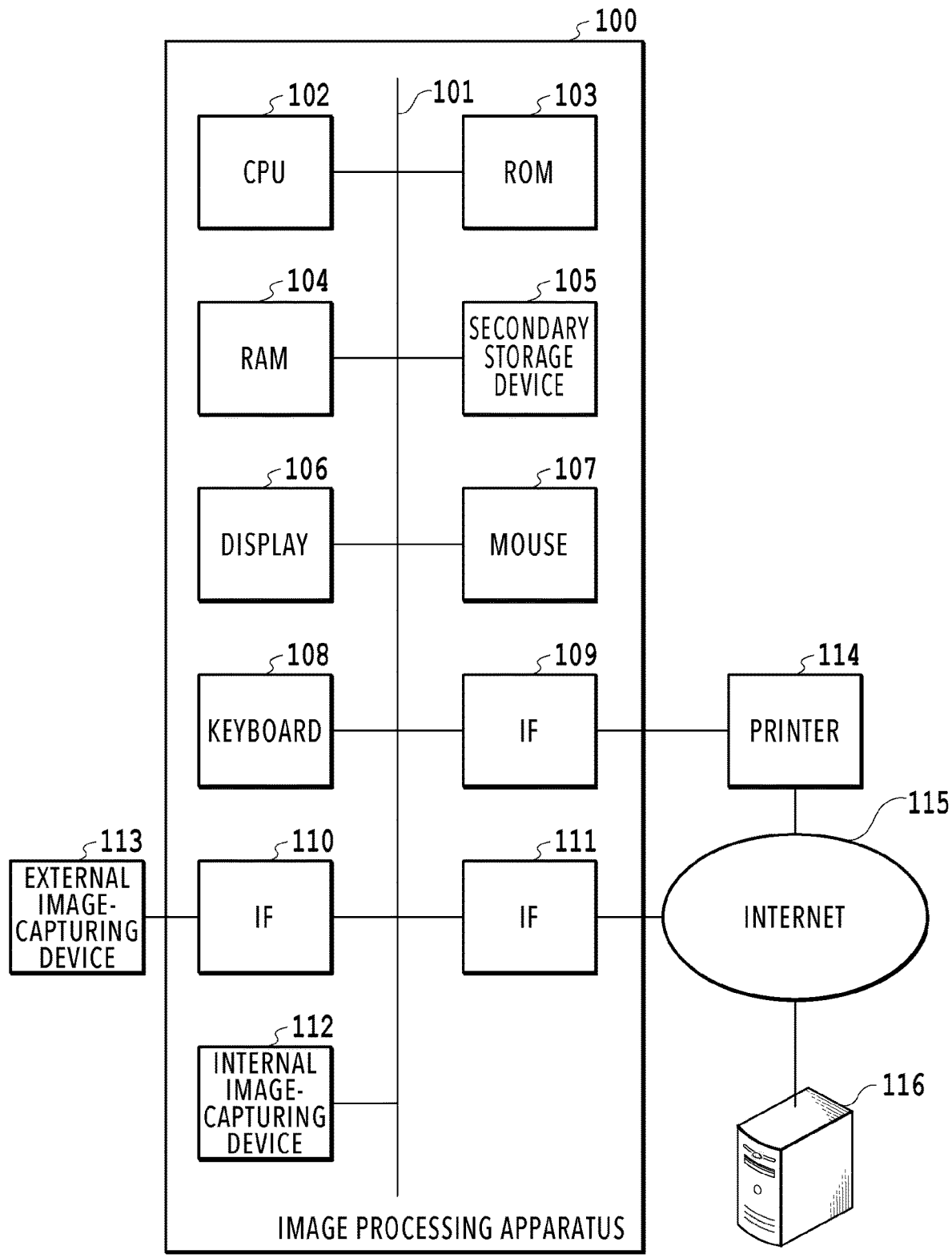
FIG. 1 is a diagram illustrating a hardware configuration example of an image processing system.

FIG. 1 is a diagram illustrating a hardware configuration example of an image processing system according to the present embodiment. In the image processing system according to the present embodiment, an image processing apparatus 100 (information processing apparatus) and a printer 114 are connected to each other via a network. Although in FIG. 1, the image processing apparatus 100 is also connected to a server 116 via a network, the image processing apparatus 100 does not necessarily have to be connected to the server 116.

The image processing apparatus 100 may be, for example, a portable information terminal such as a smartphone, tablet PC, and laptop PC or a non-portable one such as a desktop PC. Hereinafter, in the present embodiment, it is assumed that the image processing apparatus 100 is a smartphone having a touchscreen. The image processing apparatus 100 includes a central processing unit (CPU) 102, read only memory (ROM) 103, and random access memory (RAM) 104. The image processing apparatus 100 also includes a secondary storage device 105, a display 106, a mouth 107, a keyboard 108, interfaces (IF) 109, 110, and 111, and an internal image-capturing device (image capturing unit) 112.

The CPU (processor) 102 executes various processes described later according to programs. Although FIG. 1 shows a single CPU 102, the image processing apparatus 100 may include multiple CPUs or CPU cores. The ROM 103 stores programs executed by the CPU 102. The RAM 104 is memory for temporarily storing various kinds of information while the CPU 102 is executing a program.

The secondary storage device 105 is a storage medium such as a hard disk or flash memory. The secondary storage device 105 stores data such as files and databases for storing processing results of image analysis or other processes as well as various programs. The display 106 shows user interfaces (UIs) to receive operations for executing various processes and also shows various kinds of information such as results of executed processes. The display 106 may include a not-illustrated touch sensor. Here, it is assumed that the user inputs operations by touch operations such as touching, swiping, and pinching. Note that the image processing apparatus 100 may include UIs such as a mouth or a keyboard for inputting text or other information.

The internal image-capturing device 112 captures images. Image data obtained by image-capturing is subjected to predetermined image processing and then stored into the secondary storage device 105. Image data may be obtained from an external image-capturing device 113 connected to the image processing apparatus 100 via the IF 110 and stored into the secondary storage device 105.

The IF 111 is capable of communicating with external apparatuses (for example, the printer 114 and the server 116) via a network such as the Internet 115.

The IFs 109 to 111 are interfaces having at least one communication mode, either wired communication or wireless communication, and communicates with external apparatuses according to the communication mode available. The image processing apparatus 100 is capable of, via the IFs 109 to 111, obtaining image data from the server 116 connected to the Internet 115 or the external image-capturing device 113 and outputting image data (print data) or the like to the printer 114. Examples of the wired communication includes USB and Ethernet (registered trademark). Examples of the wireless communication include wireless LANs, Near Field Communication (NFC), Bluetooth (registered trademark), and infrared communication.

The various constituents included in the image processing apparatus 100 are interconnected via an internal bus 101 and controlled by the CPU 102 via the internal bus 101. In the present embodiment, the image processing apparatus 100 is the execution location for software (software execution environment) where programs and the like are executed by the CPU 102 (control unit).

In the configuration described in FIG. 1, the printer 114 is an example of the external apparatus, but the present disclosure is not limited to this example. The external apparatus may be an image forming apparatus of another type such as a multifunction printer (MFP) or a communication apparatus such as a FAX machine.

<Hardware Configuration of Printer>

Figure 2:
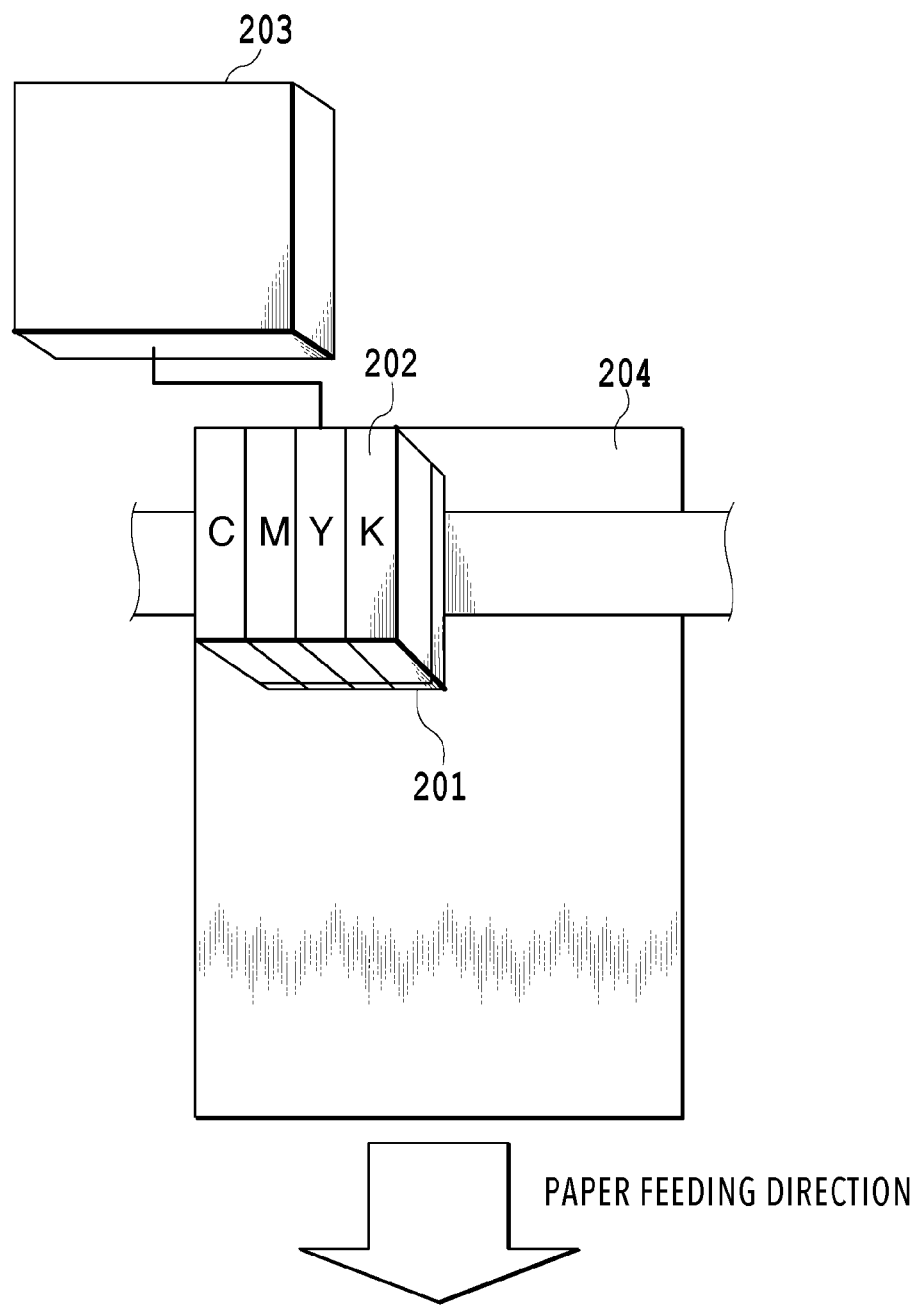
FIG. 2 is a schematic diagram illustrating part of the hardware of a printer.

FIG. 2 is a schematic diagram illustrating part of the hardware of the printer 114. Although in the present embodiment, the printer 114 described as an example is an inkjet printer, the present disclosure is not limited to this example. The printer 114 may be an electrophotographic printer.

FIG. 2 is a schematic diagram illustrating a print head of the printer 114 according to the present embodiment. The print head 201 has an ink unit 202 mounted on it which contains ink. The ink unit 202 in FIG. 2 has four colors, but the ink unit 202 may have any number of colors. The control circuit unit 203 includes a storing unit, a calculation unit, and a communication unit which are necessary to drive the print head 201. The print head 201 receives print signals and control signals from the control circuit unit 203 and ejects ink based on the print signals according to the control signals. A print medium 204 which is a recording medium is conveyed by not-illustrated conveying rollers, and an image is formed on the print medium 204.

Figure 3:
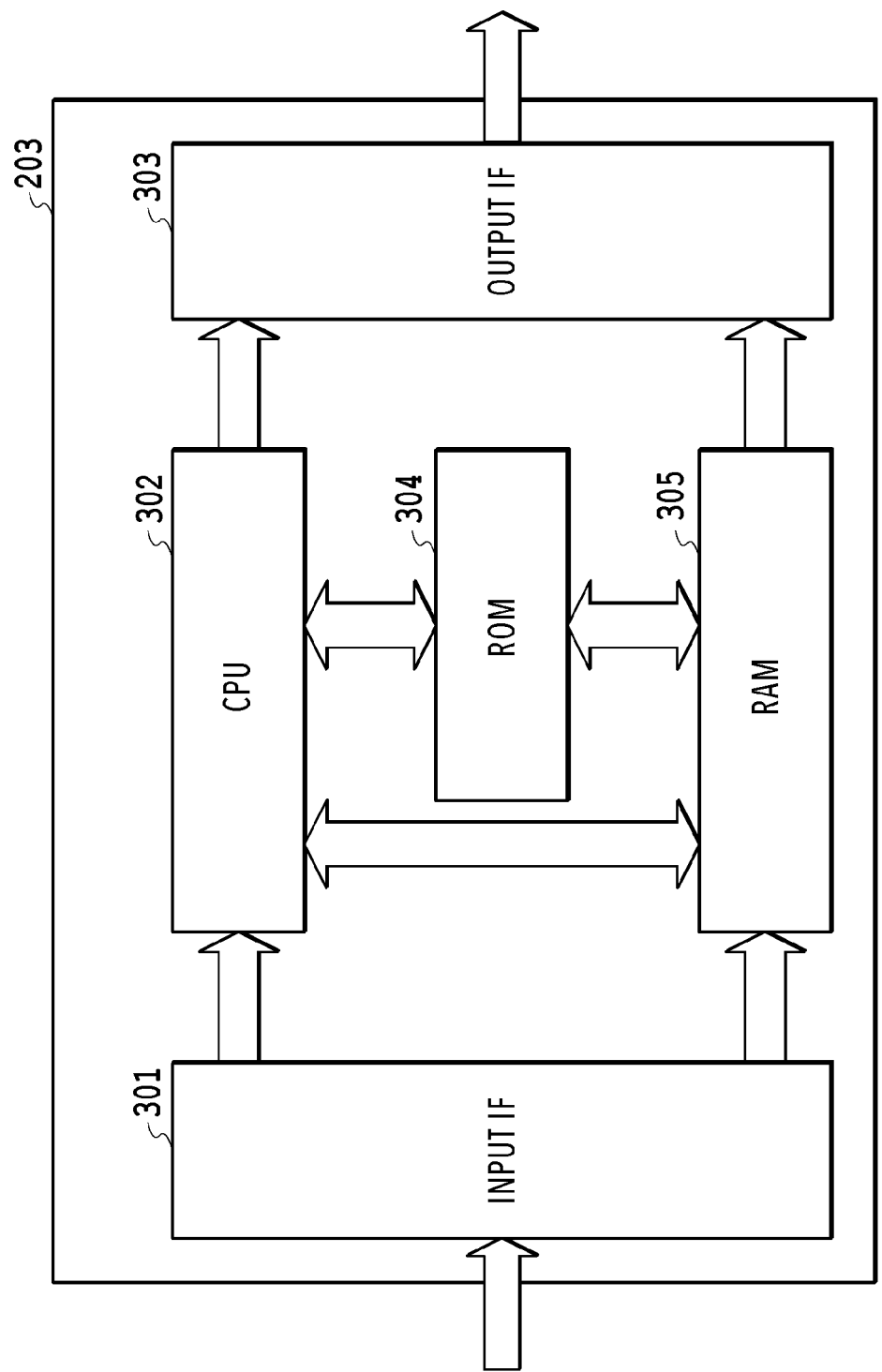
FIG. 3 is a diagram illustrating a configuration example of a control circuit unit of the printer.

FIG. 3 is a block diagram illustrating a configuration example of the control circuit unit 203. The control circuit unit 203 includes an input interface 301, CPU 302, output interface 303, ROM 304, and RAM 305. The input interface (IF) 301 receives input of image data and input of control signals for driving the print head 201 from an image processing apparatus or the like outside the printer 114. The input interface 301 transmits the image data and control signals the input of which the input interface 301 has received to the RAM 305 and the CPU 302. The CPU 302 executes a control program stored in the ROM 304, which in nonvolatile memory, to perform signal processing on the image data. The image data subjected to the signal processing is outputted as print data with control signals from the output interface 303. The outputted print data and control signals drive the print head 201, and thus an image is printed on the print medium 204.

<System Configuration>

Figure 4:
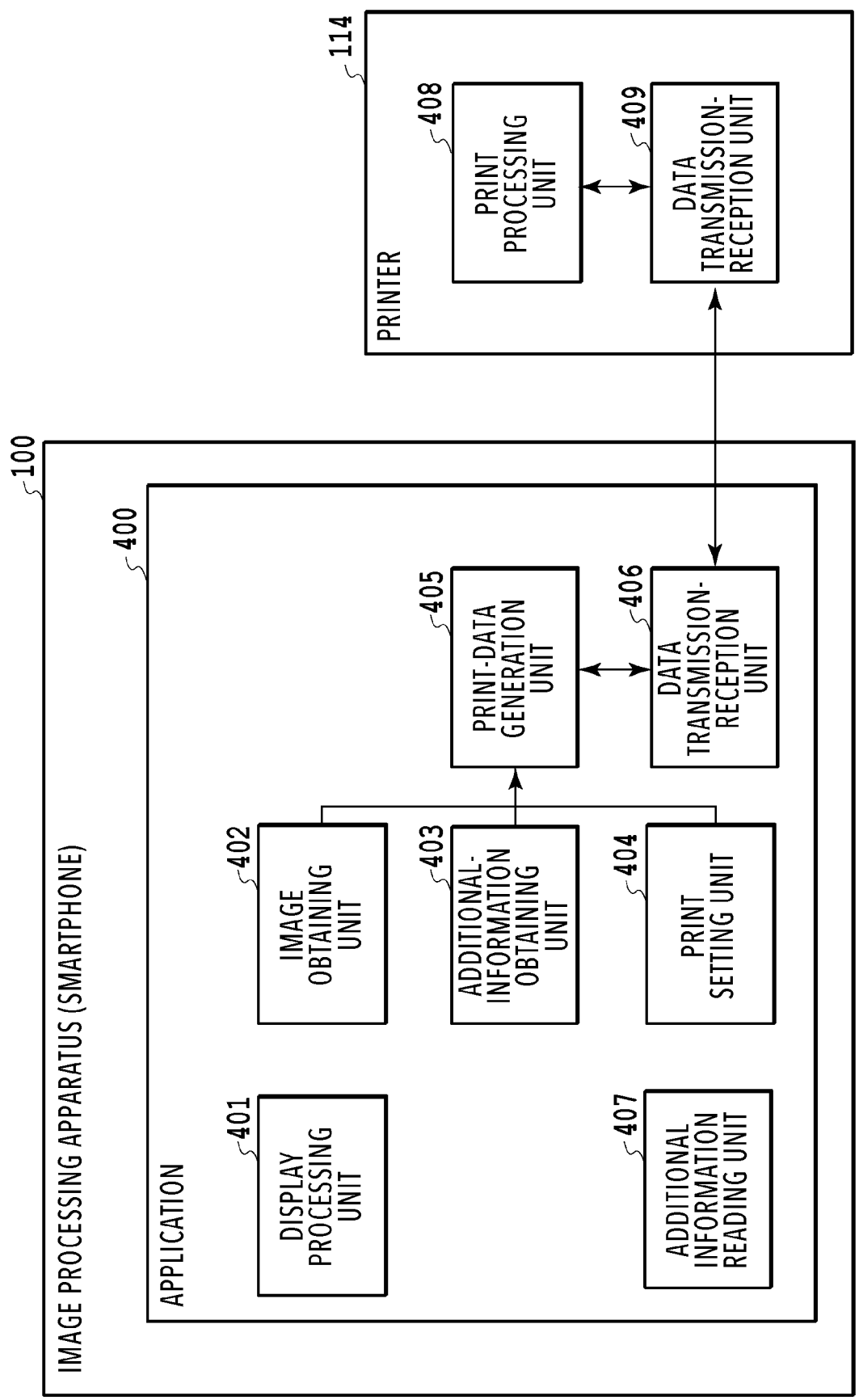
FIG. 4 is a block diagram illustrating a configuration example of the image processing system.

FIG. 4 is a block diagram illustrating a configuration example of an image processing system including an application 400 that runs in the image processing apparatus 100 and the printer 114. The application 400 is software to implement functions of a display processing unit 401, image obtaining unit 402, additional-information obtaining unit 403, print setting unit 404, print-data generation unit 405, data transmission-reception unit 406, and additional-information reading unit 407. The application 400 may implement functions other than those of the above units. The application 400 is a program stored in the ROM 103 or the secondary storage device 105 illustrated in FIG. 1 and is executed by the CPU 102 to operate. In other words, the CPU 102 executes the program stored in the ROM 103 or the secondary storage device 105, so that the CPU 102 functions as the units of the application 400. The application 400 includes a function of generating image data having additional information embedded in it based on image data for printing and inputted additional information. The application 400 also has a function of transmitting print data for printing the generated image data to the printer 114.

The printer 114 includes a print processing unit 408 and a data transmission-reception unit 409. The print processing unit 408 and the data transmission-reception unit 409 are implemented by the CPU 302 executing a program stored in the ROM 304.

Figure 5:
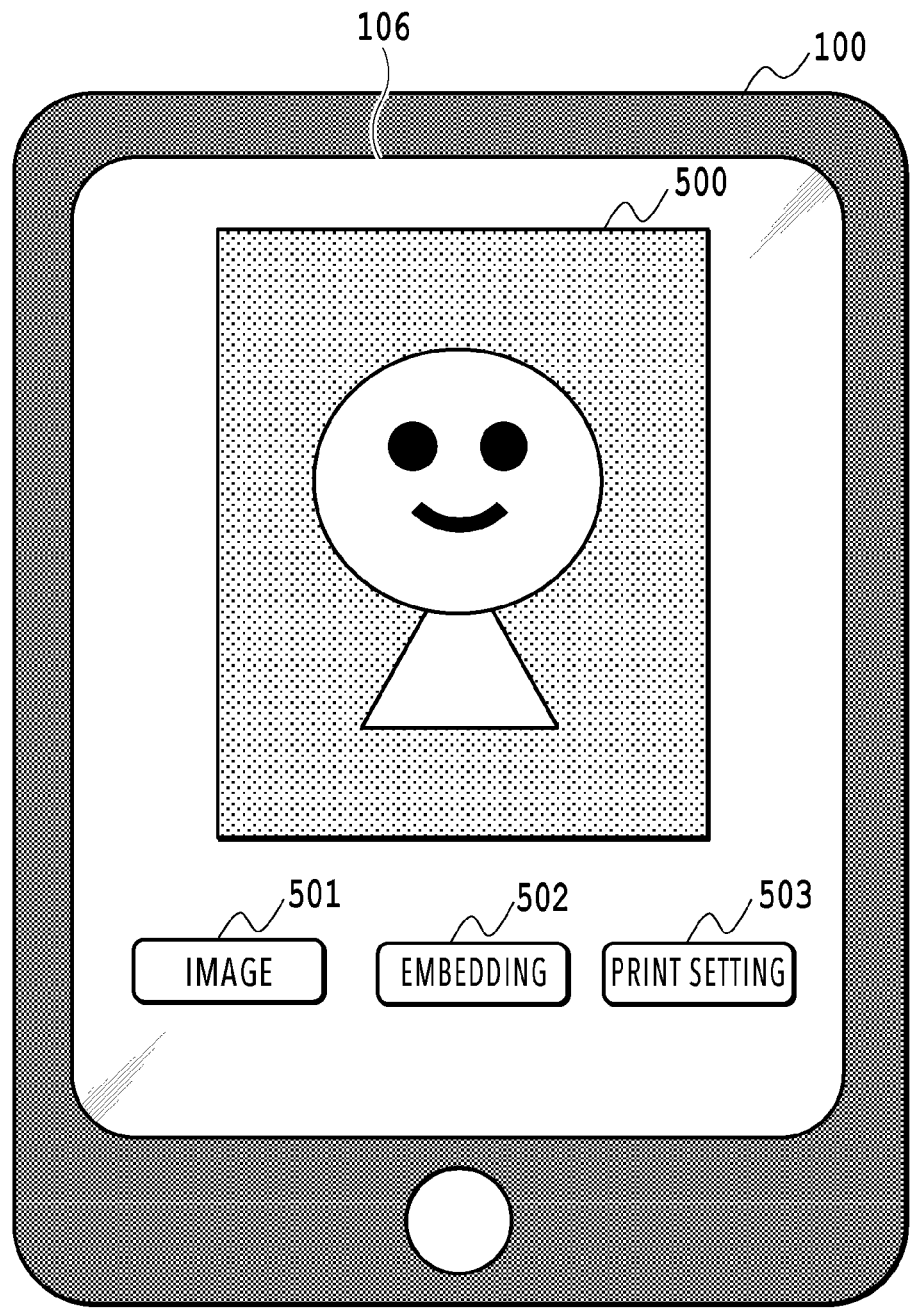
FIG. 5 is a diagram illustrating an example of a screen of an application.

FIG. 5 is a diagram illustrating an example of a screen of the application 400 running on the image processing apparatus 100. In the following, processes performed in each block in FIG. 4 will be described with reference to the screen example illustrated in FIG. 5.

The display processing unit 401 performs a process for displaying text information to be embedded as additional information, an image to be used for the printing process, and other information on the display 106 of the image processing apparatus 100. The display processing unit 401 also has a function of displaying information on user interfaces (UIs) such as buttons for selecting an image, text, and other items and a list of print setting items.

In FIG. 5, the display 106 of the image processing apparatus 100 shows an image selection button 501, an embedding-information setting button 502, and a print setting button 503. The content editing area 500 shows content (an image) currently being edited.

The image obtaining unit 402 obtains an image into which additional information is to be embedded. For example, in the case where the image selection button 501 in FIG. 5 is selected, a dialog box for image selection appears, which allows the user to select an available image in the image processing apparatus 100. Although the present embodiment is based on an example in which image selection is performed using a dialog box for image selection, alternatively a configuration in which the internal image-capturing device 112 is started, and a captured image is used for the purpose is possible. The image obtained by the image obtaining unit 402 is displayed in the content editing area 500. The image can be enlarged, reduced, rotated, or moved by touching, swiping, or pinching operations. Other than these operations, the image may be edited as appropriate.

Figure 6:
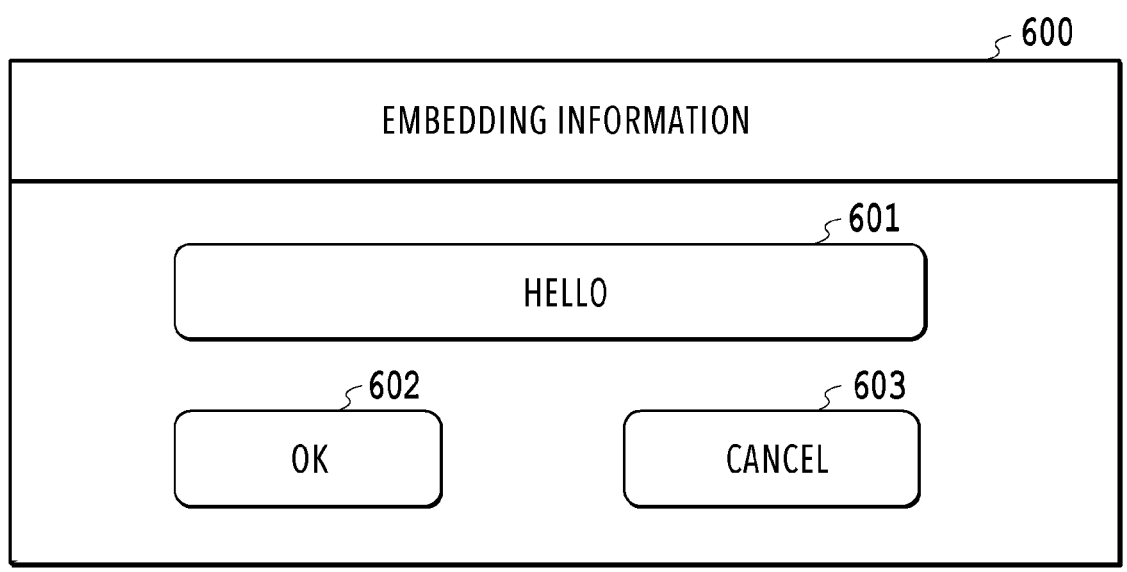
FIG. 6 is a diagram illustrating an example of a dialog box for embedding-information setting in the application.

FIG. 6 is a diagram illustrating an example of a dialog box 600 for setting embedding information. In the case where the embedding-information setting button 502 in FIG. 5 is selected, the display 106 shows the dialog box 600 for setting embedding information, illustrated in FIG. 6. The additional-information obtaining unit 403 obtains, as additional information, for example, information edited through the dialog box 600 for setting embedding information, as illustrated in FIG. 6. In the case where the user taps an area 601 in FIG. 6, the user is allowed to edit information (additional information) to be embedded. Here, as an example, assume the case of embedding the character string "hello" as additional information. Although the present embodiment is based on an example of text input, various kinds of information may be embedded as additional information, such as copyright information on the image, the date and time of the image capturing, the place where the image was captured, and the person who captured the image. Information on a link destination such as a uniform resource locator (URL) may be embedded as additional information. Information other than text, such as audio and video may be embedded as additional information. In the case where there is a common data table, identification information for identifying data in the data table may be embedded as additional information. In the case where the user has finished input, the user presses the OK button 602. In the case where the user wants to cancel it, the user presses the cancel button 603. In this configuration, the user intentionally inputs additional information that the user intends to embed as described with reference to FIG. 6, but as an alternative configuration, the application 400 may input additional information without the user being aware of it.

Figure 7:
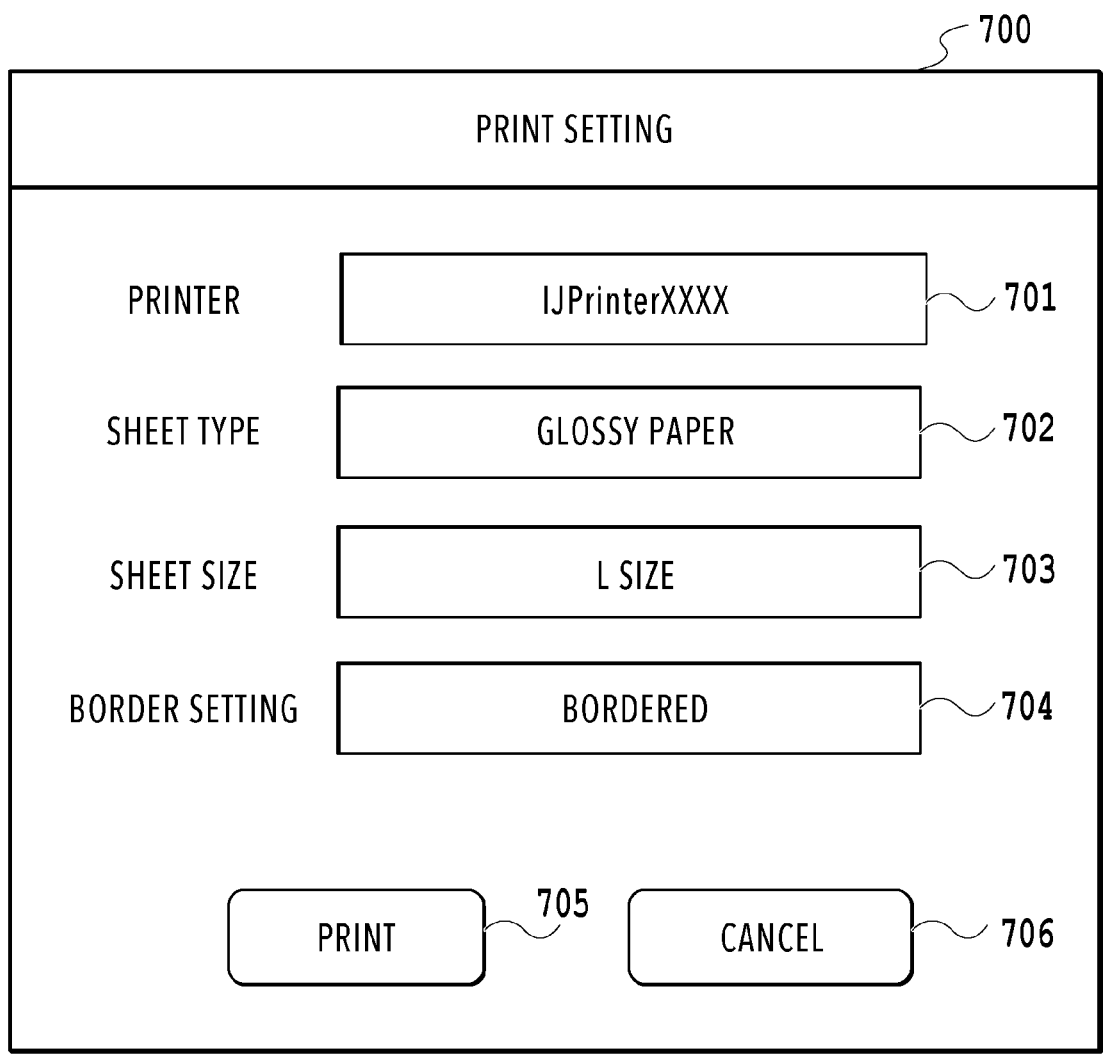
FIG. 7 is a diagram illustrating an example of a dialog box for print setting in the application.

FIG. 7 is a diagram illustrating an example of a dialog box 700 for print setting. In the case where the print setting button 503 in FIG. 5 is selected, the display 106 shows the dialog box 700 for print setting illustrated in FIG. 7. Through the dialog box 700 for print setting, the user selects a printer, a sheet type, and a sheet size and also sets bordered/borderless printing. In the case where a printer selection list 701 is tapped, a list of available printers appears, which allows the user to select a desired printer. Similarly, in the case where a sheet-type selection list 702 is tapped, a list of available sheet types appears, which allows the user to select a desired sheet type. Examples of sheet types include glossy paper, matte paper, and plain paper. In the case where a sheet-size selection list 703 is tapped, a list of the sheet sizes that can be used for the sheet type selected from the sheet-type selection list 702 appears, which allows the user to select a desired sheet size. The print border setting 704 is for selecting border setting (bordered/borderless) for printing. Bordered printing is a printing method for forming margins at the four edges of the print image. Borderless printing is a printing method for printing in which no margins are formed on the sheet.

In the case where the print start button 705 is pressed, the print setting unit 404 transmits print setting to the print-data generation unit 405, and the process is shifted to a printing step. In the case where the cancel button 706 is pressed, printing is not executed, but the screen returns to the previous one.

Note that the information on print setting for the printer displayed in the dialog box 700 for print setting in FIG. 7 may be prestored in the image processing apparatus 100 or may be downloaded as appropriate from the server 116 or the printer 114 through the network.

The print-data generation unit 405 performs rendering of content, a process of embedding additional information, and a process of generating data necessary for printing in the printer 114. In the rendering process, image data to be used for printing is generated from the content obtained by the image obtaining unit 402 and being displayed in the content editing area 500 in FIG. 5. In an additional-information embedding process, the additional information obtained by the additional-information obtaining unit 403 is embedded into the image data generated in the rendering.

In the present embodiment, content used for generating print data is described in a web standard language (such as hypertext markup language (HTML), CSS, and JavaScript (registered trademark)). The present embodiment is described based on an example in which content to be used for printing is described using Scalable Vector Graphics (SVG) which is a graphic notation method in HTML. However, the present disclosure is not limited to this example. For example, Canvas used for describing graphics in HTML may be employed.

FIGS. 8A and 8B are diagrams illustrating description examples of content to be used for printing in the present embodiment. The present embodiment is described based on an example of content having a single image. FIG. 8A shows a description example of SVG for this case. The description example of SVG in FIG. 8A is for explaining the outline, and hence, description of detailed settings is omitted. The numbers at the left ends of FIGS. 8A and 8B indicate line numbers.

The first line in FIG. 8A indicates that the content is described in SVG and also indicates the size of the SVG. The second line shows description on the image added to the content. The present embodiment is described based on the assumption that the application 400 creates content having a single image, but text or stamps may be added to the content. In that case, information on the added text or stamps is described by SVG.

Figure 9:
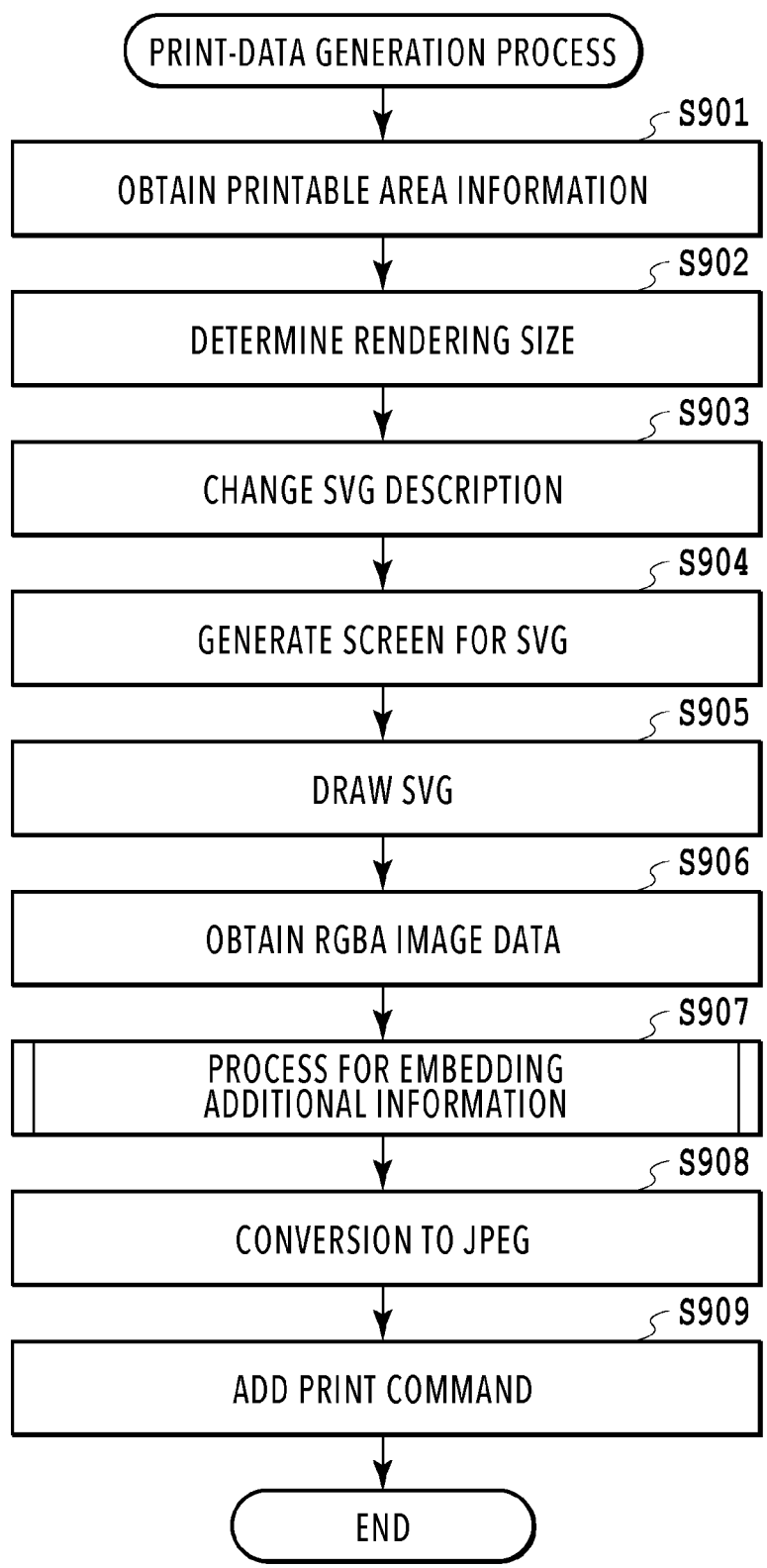
FIG. 9 is a flowchart illustrating an example of a print-data generation process.

Next, with reference to FIG. 9, detailed description is made of processes until generation of print data, performed by the print-data generation unit 405, including executing rendering of the SVG content and performing the additional-information embedding process (also referred to as a multiplexing process).

FIG. 9 is a flowchart illustrating an example of a print-data generation process performed by the print-data generation unit 405. Note that the letters S written in the flowchart and referred to in the description of the present specification means "step".

First, at S901, the print-data generation unit 405 obtains printable-area information. The printable-area information defines the printable area of a print medium (a sheet, a disk medium, or the like) to be used for printing.

Next, at S902, the print-data generation unit 405 determines a rendering size according to the sheet setting. In the case where the sheet setting indicates the L size, bordered printing, and 300 dpi print resolution, the rendering size is determined to be 950 px (pixels)×1400 px. In the case where print resolutions other than 300 dpi can be set in the print setting, a rendering size corresponding to another print resolution will be determined. For example, in the case where the sheet setting indicates the L size and bordered printing the same as above and indicates 600 dpi print resolution, the rendering size will be determined by calculation to be 1900 px×2800 px.

At S903, the print-data generation unit 405 rewrites part of the SVG, which is content, for printing. Here, according to the rendering size determined at S902, the lateral width and longitudinal width of the SVG are changed to have an image size to be transmitted to the printer. Specifically, the "widths" in the first and second lines in the SVG of FIG. 8A are changed to "950", and the "heights" in the first and second lines are changed to "1400", and "viewBox" in the first line is changed to "0 0 950 1400". FIG. 8B shows an example of a rewritten SVG.

Next, at S904, the print-data generation unit 405 makes a request for screen generation to a not-illustrated operating system (OS) of the image processing apparatus 100. Here, with reference to the SVG rewritten at S903, information on the area of 950 px×1400 px is obtained. Then, the OS executes screen generation (950 px×1400 px) for the SVG. Here, the information on the size of the SVG may be held not by the SVG itself but by the application. The screen is generated by the OS as an off-screen screen. An off-screen screen means a screen not displayed on the UI.

At S905, the print-data generation unit 405 requests the OS to draw the SVG on the screen generated at S904. The OS loads the information on the SVG. At the time when the information on the SVG is loaded, the application 400 receives a notification from the OS that the loading has been completed. For this notification, a standard function included in the OS is used. For example, for the Objective-C language which is used to create iOS applications, the webViewDidFinishLoad function or the like corresponds to notification of loading completion. For the Java (registered trademark) language used to create Android applications, the onPageFInished function or the like corresponds to notification of loading completion. Having received the notification of loading completion, the application 400 determines that the drawing of SVG is completed and proceeds to the next step.

At S906, the print-data generation unit 405 makes a request to the OS for the image data of the content. Here, the image data means RGBA data on the content drawn on the off-screen screen. In short, it means execution of screen capturing. According to the request from the application 400, the OS executes screen capturing of the off-screen screen on which the content is drawn to obtain RGBA data and sends the RGBA data to the application 400.

At S907, the print-data generation unit 405 performs a process of embedding additional information into the obtained RGBA data. Additional information is embedded into an image so as to be visually less noticeable. In the additional-information embedding process, the additional information obtained by the additional-information obtaining unit 403 is used. Details of the embedding process will be described later. The RGBA data obtained from the OS at S906 includes A (transparency) information. This transparency information is not used in printing in the present embodiment. Hence, the transparency information is deleted, and RGB data is used for the additional-information embedding process.

At S908, the print-data generation unit 405 converts the RGB data subjected to the additional-information embedding process into JPEG image data. Although the present embodiment is described based on an example in which the image data is converted into a JPEG format, the image data may be converted into a PDF format using a known Portable Document Format (PDF) technique.

At S909, the print-data generation unit 405 adds a print command to be sent to the printer 114 to the JPEG image data generated at S908. Here, the data to be added to the JPEG image data is generated based on the print setting information. If necessary, commands for controlling the printer 114 may be added.

FIG. 10 is a diagram illustrating an example of a print command for print data. The print command used here is described in an XML format. For example, the third to fifth lines in FIG. 10 show a description of a printer setting "printing is to be performed with a sheet of glossy paper of the L size in the standard mode". The seventh to ninth lines show a description indicating that the print data is "JPEG data having a lateral width of 950 px and a longitudinal width of 1400 px". The JPEG data converted at S909 is inserted in the tenth line.

The printer 114 executes printing by receiving the print command described above along with the image data (JPEG data). With this step, the print-data generation unit 405 completes the rendering process, the additional-information embedding process, and the print-data generation process.

Returning to the explanation of FIG. 4, the data transmission-reception unit 406 of the image processing apparatus 100 transmits the print data to the printer 114. The application 400 requests the OS to transmit the print data, and the OS transmits the data received from the application to the printer 114. The data transmission is performed using, for example, a known wireless WiFi technique that connects the image processing apparatus 100 and the printer 114 with radio waves. The data transmission method may employ other known methods. For example, the image processing apparatus 100 and the printer may be connected through USB ports. On the image processing apparatus 100 side, a printer driver performs conversion into raster data printable by the printer. This printable raster data may be transmitted to the printer through the USB ports. The printer may convert the received raster data into printable data to perform printing.

Next, a description will be given of the process on the printer 114 side. The data transmission-reception unit 409 of the printer 114 receives the print data transmitted from the image processing apparatus 100. The data transmission-reception unit 409 analyzes the print commands included in the received print data and transmits print setting information obtained from the analysis, such as a sheet size and a sheet type, to the print processing unit 408. The data transmission-reception unit 409 also decodes the JPEG file included in the print data to convert it to image data and transmits the image data after the conversion to the print processing unit 408. Here, in ordinary printing, in the case where print setting information includes correction-process information, an image correction process may be executed on the image data. Examples of the image correction process include various kinds of correction, such as lightness adjustment, contrast adjustment, and color-balance adjustment, as well as backlight correction and red-eye correction on the assumption of photograph printing. However, in the case of printing an image having additional information embedded in it, image processing may erase the embedded information or make the signal of the embedded information weaker. Hence, it is assumed that image correction processes are not executed. To execute an image correction process as above, it is desirable that the image correction process be executed before the print data is generated by the application 400 (in other words, before additional information is embedded into it).

The print processing unit 408 performs color separation on the image data received from the data transmission-reception unit 409 such that the image can be expressed by suitable colors when outputted by the printer, and then the print processing unit 408 converts the color separation results to ink color data. The method of conversion into ink color data may be any method among known color conversion processes that convert data in image format (RGB) used for screen display into data on ink colors (CMYK) for printing.

For example, assume that the ink colors of the printer 114 are the four colors: cyan C, magenta (M), yellow (Y), and black (K). The print processing unit 408 converts inputted data expressed by the three colors—red (R), green (G), and blue (B)—into ink color data expressed by the four colors of C, M, Y, and K. A color separation table is used for the conversion. The color separation table is a three-dimensional look-up table that converts an input of three values of R, G, and B into values of the ink colors of C, M, Y, and K. The print processing unit 408 converts values of R, G, and B into values of the ink colors of C, M, Y, and K for each pixel of the inputted image data using the color separation table.

The print processing unit 408 further performs image processing including output tone correction and halftoning using image processing parameters such as look-up tables to convert the ink color data into printing output data.

The printing output data after the conversions is transmitted to the control circuit unit 203 illustrated in FIG. 2. The control circuit unit 203 ejects ink onto the print medium 204 according to the printing output data to form an image. The print image thus formed has the additional information embedded in it. With the above, the process of printing print data is finished.

The additional-information reading unit 407 of the application 400 has a function of extracting additional information by reading it from a print image having the additional information embedded in it. Details of the process of extracting additional information will be described later. Although the example of FIG. 4 is one in which the application 400 performs both embedding and reading additional information, embedding and reading additional information may be performed in different applications.

<Additional-Information Embedding Process>

Figure 11:
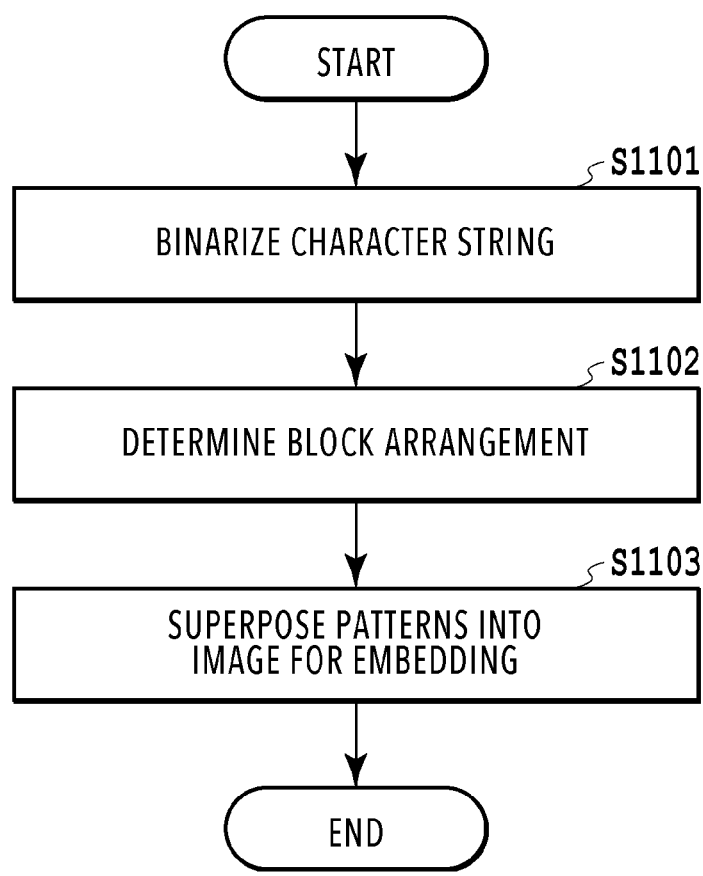
FIG. 11 is a flowchart of an additional-information embedding process.

The following describes a process of embedding additional information into image data subjected to rendering, which is performed by the application 400. FIG. 11 is a flowchart for explaining the additional-information embedding process, which is a diagram for explaining details of S907 in FIG. 9. The process illustrated in FIG. 11 is performed by the print-data generation unit 405 of the application.

At S1101, the print-data generation unit 405 converts additional information into binary data. Here, description is made based on an example in which the character string "hello" is inputted as additional information. Binary data is information consisting of "0s" and "1s", and a series of "0s" and "1s" has a specific meaning. The correspondence between binary data and characters is defined by what is called "character code". For example, in the case of an example of "Shift JIS" which is one of character code systems, "h" corresponds to "01101000" in binary data. In the same manner, "e" corresponds to "01100101" in binary data, "l" to "01101100", and "o" to "01101111".

Specifically, the characters "hello" can be expressed by the binary data "0110100001100101011011000110110001101111". Conversely, in the case where the binary data "0110100001100101011011000110110001101111" is obtained, the characters "hello" can be obtained. In other words, additional information can be embedded by embedding data such that "0s" and "1s" can be distinguished.

Figure 12A:
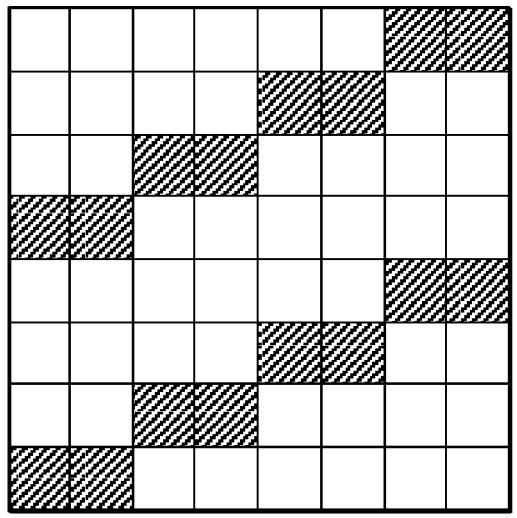
FIGS. 12A to 12D are diagrams illustrating patterns used for embedding additional information.
Figure 12B:
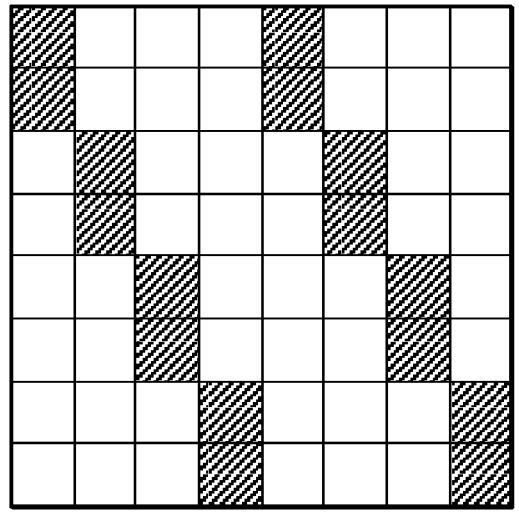

FIGS. 12A to 12D are diagrams for explaining a method of embedding information consisting of "0s" or "1s" into an image. Here, two patterns for generating "0s" and "1s", illustrated in FIGS. 12A and 12B, will be discussed. For example, assumed that the pattern of FIG. 12A represents "0" and that the pattern of FIG. 12B represents "1". The patterns of FIGS. 12A and 12B have a configuration of 8 px×8 px. One rectangle in each pattern corresponds to 1 px. The print-data generation unit 405 embeds additional information consisting of binary data of "0s" and "1s" into an image, using these patterns. This process makes a periodic pattern in areas of 8 px×8 px in an image.

Figure 12C:
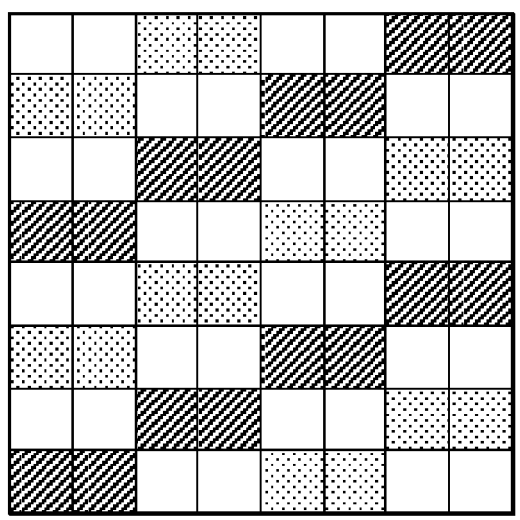
Figure 12D:
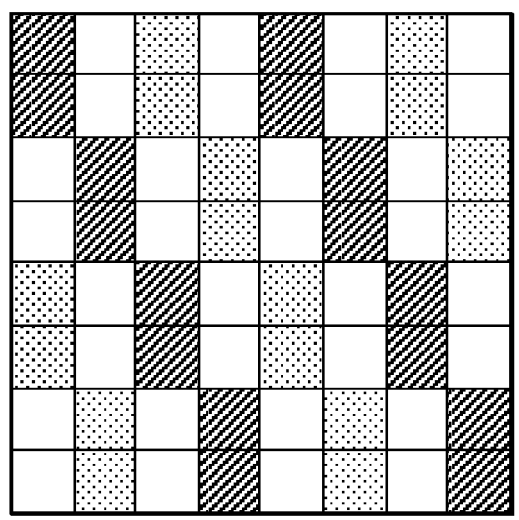

A possible method of embedding the patterns into an image is, for example, superposing the periodicity directly onto RGB values (luminance information). As an alternative method, embedding may be performed by a method of separating RGB values into another type of color space information such as luminance-color difference information (for example, CIE L*a*b* or YCrCb signals) to superpose the periodicity. As still another method, embedding may be performed by a method of separating RGB values into ink colors (for example, CMYK signals) to superpose the periodicity. To make the explanation simple, the present embodiment will be described based on an example of a method in which the periodicity is superposed on the B component of RGB components. Assume that the B components are reduced by 30 in the hatched pixels (px) in FIGS. 12A and 12B. More preferably, there should be portions subjected to addition as well as portions subjected to subtraction. A pattern including the same amounts of subtraction and addition causes a less sense of incongruity after additional information is embedded into an image. FIGS. 12C and 12D show patterns including subtraction and addition. Lightly hatched portions indicate addition portions. In this way, additional information is embedded by changing, according to a specified pattern, the values of a specified component in the RGB data of the image into which additional information to be embedded. Although the present embodiment is an example of a method in which periodic patterns are directly embedded into an original image, the present disclosure may employ another method. For example, in a possible configuration, a signal is embedded at locations corresponding to the frequency of a pattern in a frequency space, and then an image obtained by an inverse Fourier transform is added to or subtracted from the original image. In another possible configuration, all or part of an image is converted into a frequency space by a Fourier transform, a signal is embedded into locations corresponding to the frequency of a pattern, and then an image obtained by an inverse Fourier transform is used as an image with embedded information.

Figure 13:
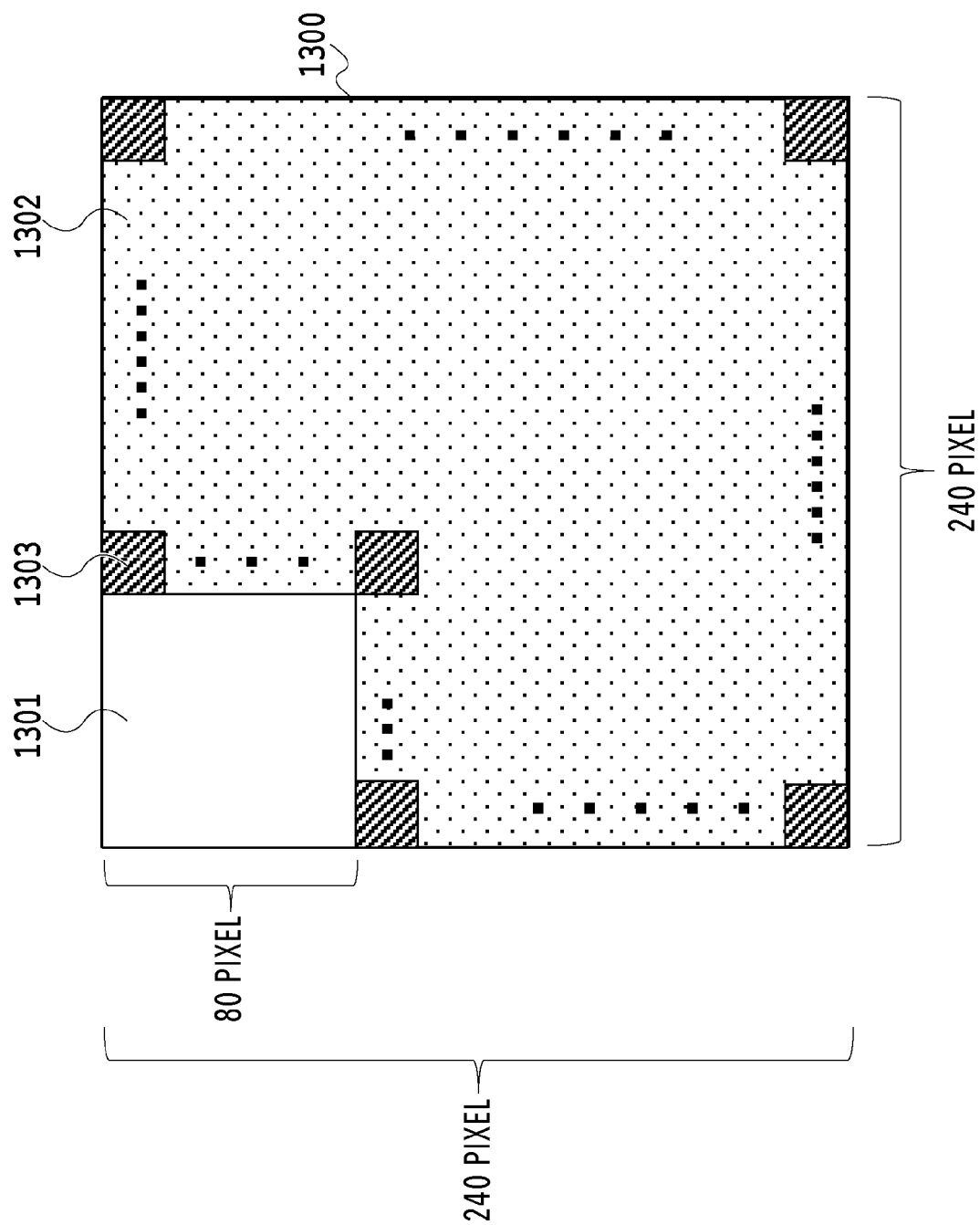
FIG. 13 is a diagram illustrating a configuration example of a unit block.

FIG. 13 is a diagram showing a unit block (multiplexing block) of additional information used in the present embodiment. The block 1300 represents one unit block. Additional information embedded can be taken out by reading all the information in this unit block. The unit block 1300 includes a marker portion 1301 and a data portion 1302. The marker portion 1301 is a block of 80×80 pixels which is used to determine the position of the unit block 1300 in reading the additional information and thus contains information indicating the marker portion. As an example of information indicating the marker portion 1301, a specific pattern including a combination of both FIGS. 12A and 12B can be used. This pattern is detected in reading to detect the marker portion 1301. As another method, the marker portion 1301 may have a pattern having a periodicity and a direction of the periodicity different from those in FIGS. 12A and 12B.

The data portion 1302 is fully covered with patterns 1303 each being FIG. 12A or 12B (in other words, a pattern representing "0" or "1"). The unit block 1300 of the present embodiment has a size of 240×240 pixels, and the data portion 1302 contains 800 patterns 1303. Since one pattern 1303 represents 1-bit information, the amount of information in the entire unit block 1300 is 800 bits.

Although in the present embodiment, the marker portion 1301 in the unit block is positioned at an upper left portion of the unit block 1300, the marker portion 1301 may be at a position other than this example, such as at an upper right portion or at the center. In addition, the marker portion 1301 may have a shape other than a rectangle or may be divided and arranged separately within the unit block.

Figure 14:
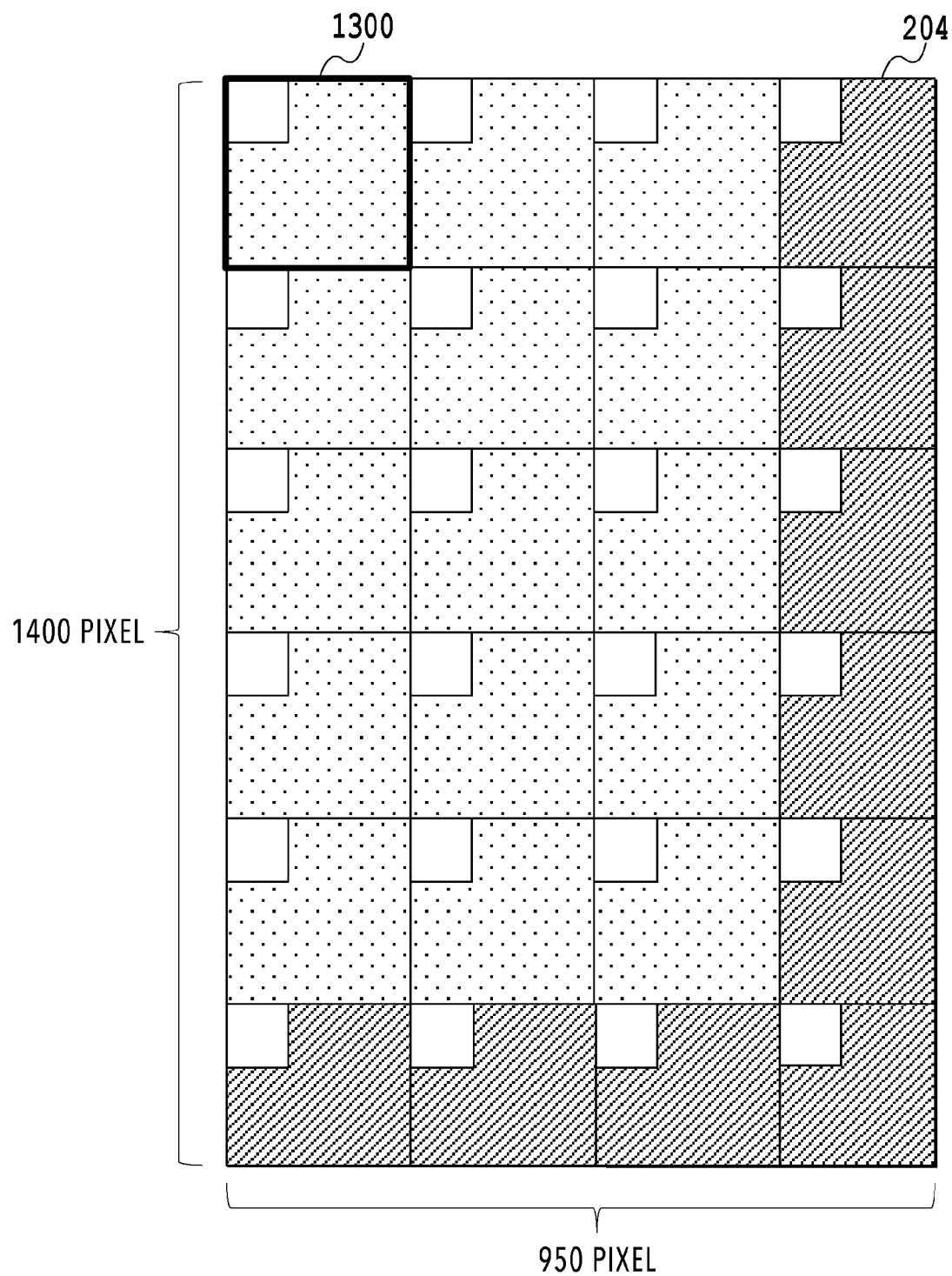
FIG. 14 is a diagram illustrating an example in which the unit blocks are embedded in a print medium.

FIG. 14 is a diagram illustrating a print medium (printed product) 204 on which the unit blocks 1300 are embedded repeatedly. Specifically, a unit block 1300 having the same additional information is embedded repeatedly over the entire surface of the print medium 204. Assume that the print setting in FIG. 14 is the L size, 300 dpi printing, and bordered printing. Through the process at S902, the print image size for this case is determined to be 950 px in lateral width and 1400 px in longitudinal width. Since the print image size is 950×1400, and a unit block 1300 has a size of 240×240, (3×5=) 15 blocks can be arranged in the entire area. To read additional information embedded in the print medium 204, a data portion corresponding to only one unit block 1300 needs to be read among the multiple unit blocks 1300 repeatedly embedded. Embedding many duplications of the same information (unit block 1300) over the entire surface of the print medium 204 increases the robustness in reading. This is because there are cases in which even if all the additional information cannot be read from a unit block 1300, referring to another unit block 1300 may make it possible to read all the additional information. Although the example here is based on a case where the same information (unit block 1300) is repeatedly embedded, the present disclosure is not limited to this case. The present disclosure is applicable to the case where information pieces different from on another (blocks having different information) are embedded over the entire surface. In FIG. 14, the right side and the lower side of the print medium have areas not large enough for the block size, but parts of the blocks are embedded in these areas, too.

Now, the explanation returns to the flowchart of the additional-information embedding process in FIG. 11. After the binarization of the additional information (character string) finishes, the process proceeds to S1102.

At S1102, the print-data generation unit 405 determines the arrangement of the unit blocks. The print-data generation unit 405 places the unit blocks, starting at the upper left of the print image until the entire area of the print image is covered. FIG. 14 illustrates an example in which the unit blocks are arranged, starting from the upper left of the print image.

At S1103, the print-data generation unit 405 embeds the additional information into the image according to the determined block arrangement. The additional information is embedded by superposing the patterns of FIGS. 12A to 12D onto pixels while associating the target image with the block arrangement in FIG. 14. Specifically, since the data portion in each block in FIG. 14 consists of the patterns of FIG. 12A and the patterns of FIG. 12B, the B values of the RGB values of the pixels corresponding to the hatched portions in each pattern are reduced by 30. In the case where the B value falls below 0, the B value is set to 0. This process is applied to the entire image to complete embedding the additional information into the image.

The process until embedding additional information into the image and printing it has been described above. Next, description will be made of the process of reading a print image having additional information embedded in it.

<Additional-Information Reading Process>

Here, the additional-information reading process is performed by the additional-information reading unit 407 of the application 400 illustrated in FIG. 4, but this process may be performed by an application in a device different from the device that performed embedding.

Figure 15:
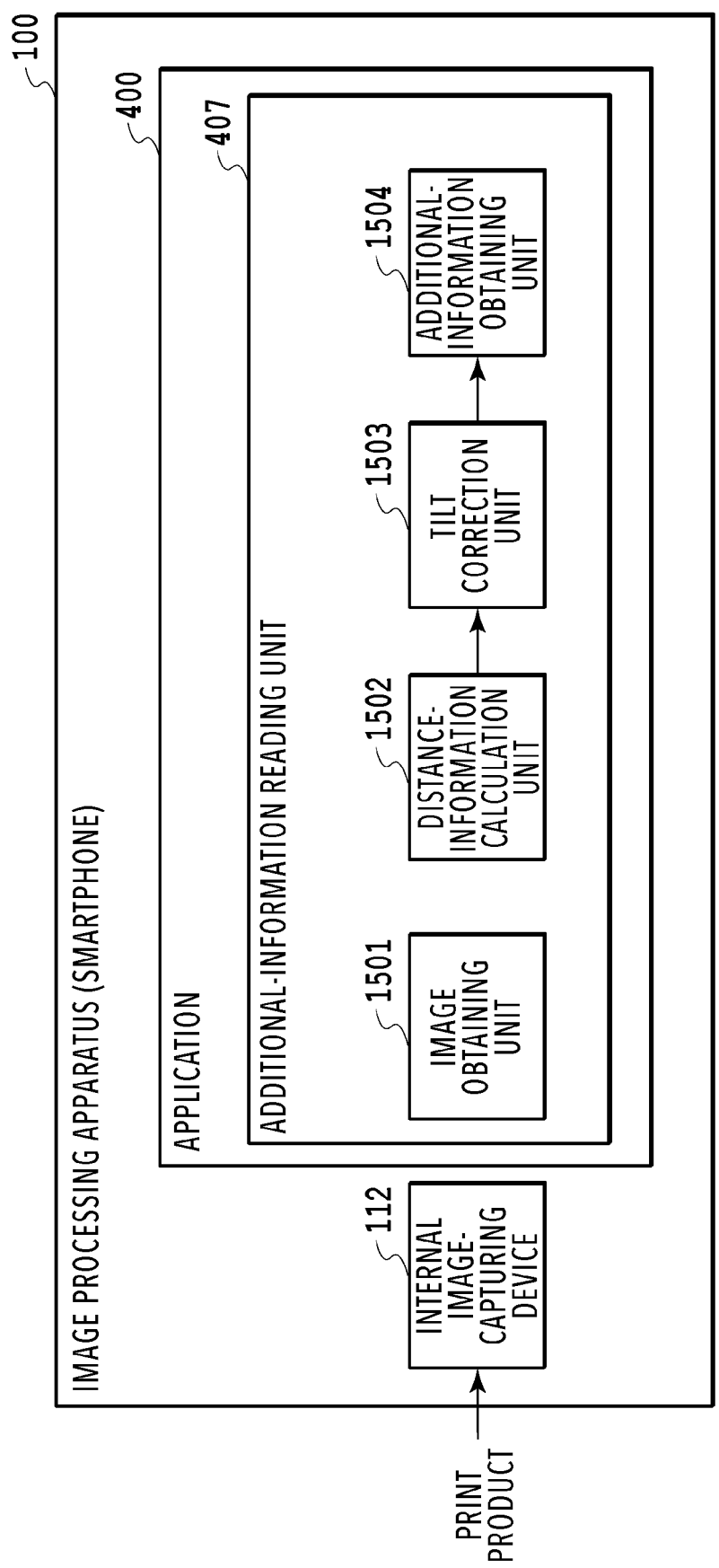
FIG. 15 is a block diagram illustrating the configuration of an additional-information reading unit.

FIG. 15 is a block diagram illustrating the configuration of the additional-information reading unit 407. The additional-information reading unit 407 included in the application 400 in the image processing apparatus 100 includes an image obtaining unit (first obtaining unit) 1501, distance-information calculation unit (second obtaining unit) 1502, tilt correction unit 1503, and additional-information obtaining unit (extraction unit) 1504.

Figure 16:
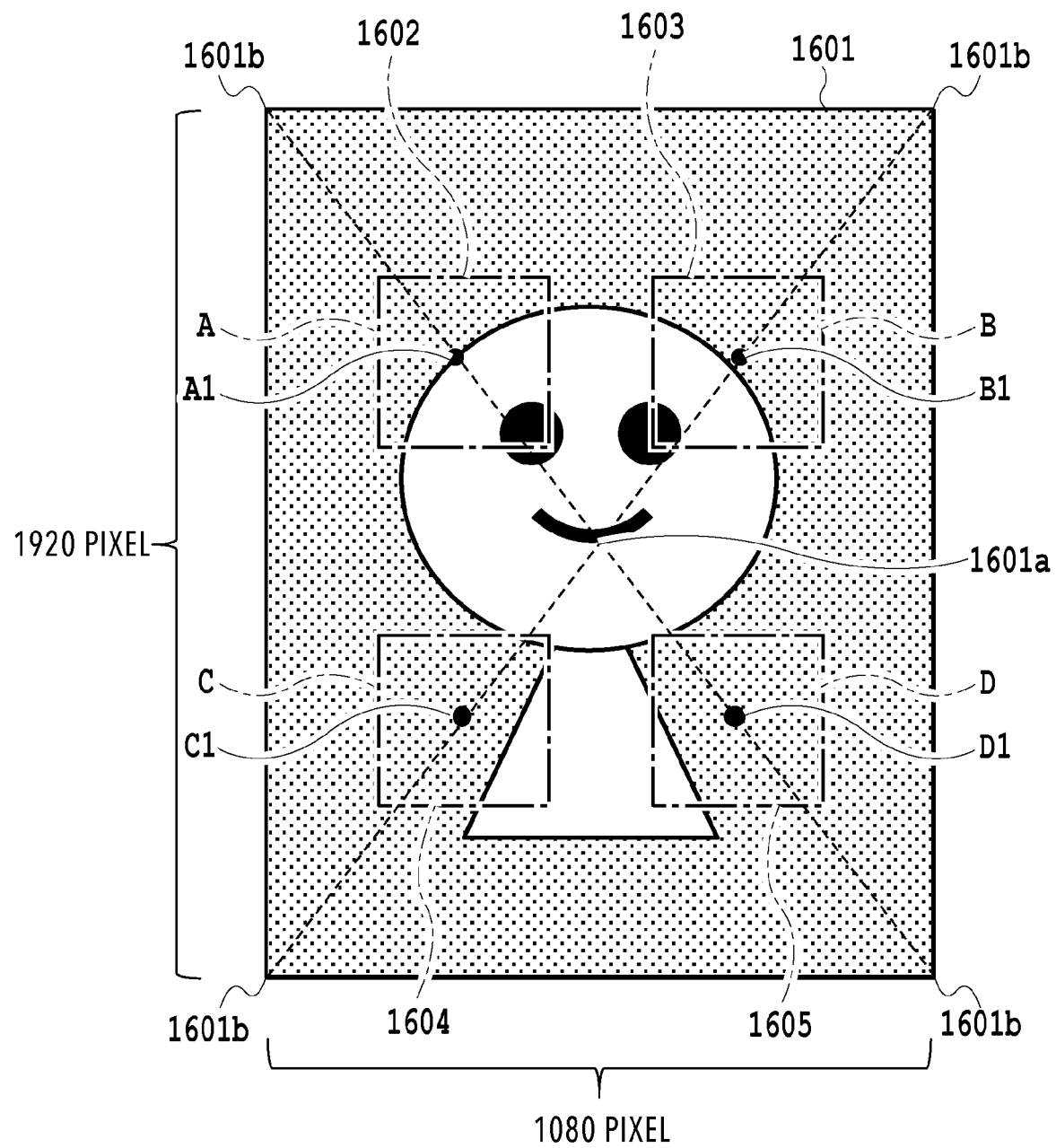
FIG. 16 is a diagram illustrating examples of a captured image and trimming areas for distance detection.

First, the image obtaining unit 1501 controls the internal image-capturing device 112 to capture an image of a print image having additional information embedded in it and thus obtains an image data. The image data obtained by image capturing (hereinafter referred to as the captured image data) may be still-image data or may be data on a still image extracted from a frame of a video. The captured image data is sent to the distance-information calculation unit (distance-information obtaining unit) 1502. It is assumed in the present embodiment that the captured image data obtained is 8-bit data in an RGB format. It is also assumed that the captured image data is 1080×1920 (2K size) in size. FIG. 16 illustrates an example of a captured image.

The distance-information calculation unit 1502 performs frequency analyses on multiple areas set in the captured image data 1601 of FIG. 16 and calculates distance information for each area. The distance information is information that indicates the relative distance between the internal image-capturing device (image capturing unit) 112 of the smartphone 100 and the print image.

In the present embodiment, four areas 1602 to 1605 included in the captured image data 1601 of FIG. 16 are set as trimming areas, and captured image data corresponding to each trimming area is cut out. Specifically, the distance-information calculation unit 1502 obtains the image data corresponding to each trimming area (hereinafter referred to as partial image data) from the captured image data. Each trimming area has a square shape having a size of 256 px×256 px. In the following description, the four trimming areas 1602 to 1605 are also referred to as area A, area B, area C, and area D, respectively.

The four trimming areas 1602 to 1605 are set to positions as described below within the captured image data 1601. Specifically, the position of each trimming area is set such that each of the centers A1, B1, C1, and D1 of the trimming areas 1602, 1603, 1604, and 1605 is on the straight line connecting the center 1601a and each vertex 1601b of the rectangular (oblong) captured image data 1601. Further, in the present embodiment, the centers A1, B1, C1, and D1 of the trimming areas are set to be positioned near the center between the center 1601a and each vertex 1601b of the captured image data 1601. This setting makes it possible to obtain effective distance information.

To calculate distance information in the trimming area, the trimming area needs to have image data (printed image data) of the print image. This is because distance information is obtained from the partial image data corresponding to the trimming area. In that sense, in the case where the position of the trimming area is set to a position close to the vertex 1601b, if an image of the print image is captured with the smartphone 100 positioned away from the print image (zoomed out), the trimming area may not include printed image data, and it may be impossible to obtain distance information. In the case where the trimming position is close to the center of the captured image data, the four trimming areas would not have much difference in the distance information, making it difficult to obtain effective information. Specifically, the process for determining the relative inclination between the image capturing unit and the print image, which process will be described later, uses differences in distance information between the trimming areas. Hence, in the case where there is not a difference in distance information between the areas, it is impossible to obtain effective information. From the reasons above, the center of each trimming area is set near the center between the center and each vertex of the captured image data in the present embodiment.

Figure 17:
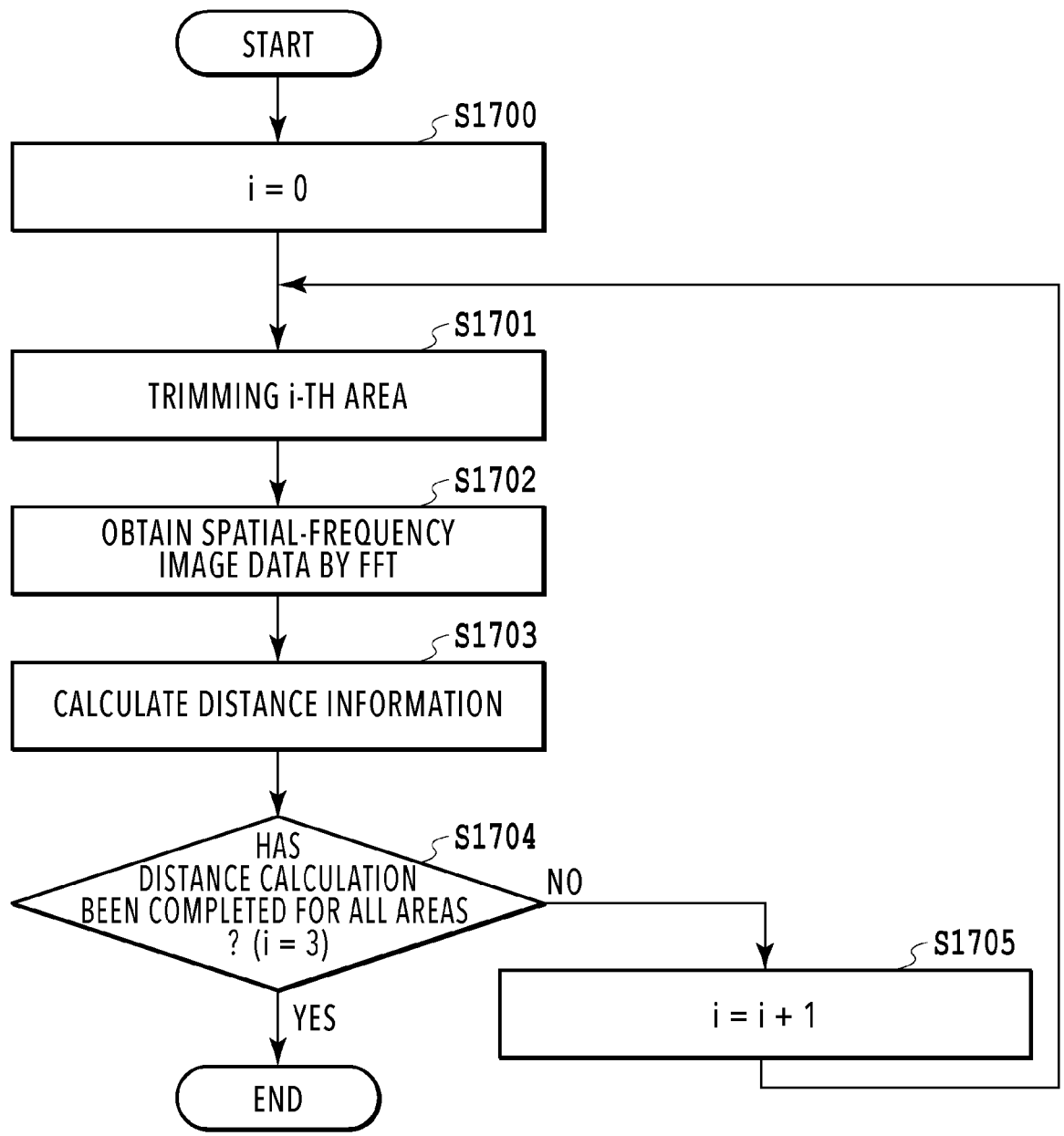
FIG. 17 is a flowchart illustrating a distance-information calculation process.

Now, the process of calculating distance information will be described with reference to the flowchart of FIG. 17. Referring to FIG. 17, the distance-information calculation unit 1502 first performs a trimming process of cutting out parts of image data from multiple areas in the captured image data (S1701). In the present embodiment, the four areas 1602 to 1605 (area A to area D) included in the captured image data 1601 of FIG. 16 are set as trimming areas, and the partial image data corresponding to the first (i=0) trimming area (for example, area A) is cut out. Here, i indicates the count value of the trimming process number, and at S1700, i is set to the initial value, 0.

Next, at S1702, the distance-information calculation unit 1502 converts the partial image data in the spatial domain obtained in the trimming process at S1701 into image data in the spatial frequency domain. The present embodiment employs two-dimensional high-speed Fourier transform (fast Fourier transform (FFT)) for the conversion of image data. A known technique is used for the FFT algorithm. FIG. 18A shows an example of spatial-frequency image data (FFT image data) which is obtained by converting the partial image data of the captured image data obtained by the internal image-capturing device 112 into data in the spatial frequency domain. In FIG. 18A, the origin point is the center of the image. The horizontal axis represents the spatial frequency in the horizontal direction (lateral direction), and the vertical axis represents the spatial frequency in the vertical direction (longitudinal direction). The further from the origin point, the higher frequency areas.

Next, at S1703, the distance-information calculation unit 1502 calculates distance information using the FFT image data obtained at S1702. The captured image data illustrated in FIG. 16, which is obtained by capturing an image of the print image, includes a large number of the two kinds of patterns illustrated in FIGS. 12A to 12D embedded in the print image (for example, the pattern illustrated in FIG. 12A and the pattern illustrated in FIG. 12B). Accordingly, in the case where the trimming image obtained by trimming a part of the captured image data is converted into data in the spatial frequency domain, peaks of the power spectrum appear at the portions corresponding to the wave directions and frequencies y of the two patterns. In an FFT image, a power-spectrum peak also appears at the portion in 180° rotationally symmetry, and hence, power-spectrum peaks appear at four points in the spatial frequency domain. FIG. 18A shows that there are peaks at four points.

FIG. 18B illustrates an example of detecting distances from an FFT image. In the case where there is no two-dimensional inclination (rotation) along the print plane between the internal image-capturing device 112 and the print image, peaks associated with the patterns of FIGS. 12A to 12D appear on lines 1801 and 1802 in FIG. 18B. Here, the frequencies at which the peaks appear varies according to the distance between the image capturing device and the print image. For example, in the case where the distance is small, peaks appear on the low frequency side, and in the case where the distance is large, peaks appear on the high frequency side. According to the print resolution, the image-capturing resolution, and the distance between the printed product and the image capturing device assumed in the present embodiment, periodicity is caused because areas each having a pixel group of 8 px×8 px corresponding to one of the patterns illustrated in FIGS. 12A to 12D are arranged continuously in the captured image. Hence, the smaller the size of the area is, and the more the number of the areas is, the higher intensity the high-frequency component has. In the case where the distance is large, the area described above is small, and the number of the areas is large. Thus, the peaks will tend to appear on the high frequency side. Hence, in the case where the peaks appear on the low frequency side, the distance can be determined to be small, and in the case where the peaks appear on the high frequency side, the distance can be determined to be large.

FIG. 18B has six ring-shaped frequency areas a to f set from the low frequency side, excluding the low-frequency area around the center. Which of these frequency areas the peaks are included in is determined in order to calculate distance D between the image capturing device and the print image. The following is an example of the method of determining the frequency area including a peak. First, the maximum value of the pixel values included in each frequency area is determined. Next, the frequency area including the largest pixel value among the obtained maximum pixel values is determined to be a frequency area including a peak. Instead of this determination method, it is possible to employ a method in which the average of the values of the pixels included in each frequency area is calculated, and the frequency area having the largest average value is determined to have a peak.

An example of the expression to calculate distance D between the image capturing device and the print image is Expression 1 shown below.

[Math. 1]

$$D = \frac{r}{32\sqrt{5}} \quad \text{(Expression 1)}$$

Here, r represents the radius of the ring-shaped frequency area. The radius is calculated from the center diameter between the outer diameter and the inner diameter of the ring-shaped frequency area. The item "Radius" in FIG. 18C shows the values of radii r of the frequency areas. Expression 1 provides a relative distance calculated based on the definition that in the case where a 256 px×256 px area obtained by image capturing at the same magnification includes an 8 px×8 px pattern of one of FIGS. 12A to 12D, the distance is 1. Specifically, because a 256 px×256 px area includes 64×√5/2 cycles of the pattern of one of FIGS. 12A to 12D, the relative distance can be determined by dividing the radius r (equivalent to the frequency) by this frequency. The item "Distance" in FIG. 18C shows the values of the distances of the areas calculated with Expression 1. FIG. 18C shows relative distances calculated based on the definition that the distance (Distance) of frequency-area c in image capturing at the same magnification is 1. However, since it is already known that the radius r of the frequency area corresponds to the distance between the image capturing device and the printed product, the radius r may be used as it is as the value corresponding to the distance. Although here, the number of ring-shaped frequency areas is six, the number of frequency areas may be larger or smaller than this number.

Here, the explanation returns to the flowchart of FIG. 17. At S1704, the distance-information calculation unit 1502 determines whether the distance-information calculation has been completed for all the trimming areas from area A to area D. In the case where a trimming area for which calculation has not been made remains, the count value is incremented at S1705, and then the process from S1701 is executed to calculate distance information for another area. In the case where it is determined at S1704 that the distance-information calculation for all the trimming areas has been completed (i=3), the distance-information calculation unit 1502 ends the distance-information calculation process and transmits the calculated distance information to the tilt correction unit 1503.

The tilt correction unit 1503 obtains the tilt state of the captured image data obtained by the internal image-capturing device 112 based on the distance information calculated by the distance-information calculation unit 1502 and corrects the captured image data according to the tilt state. In other words, the tilt correction unit 1503 provides the function of a third obtaining unit that obtains the tilt state and the function of a correction unit that corrects the tilt state.

Figure 19B:
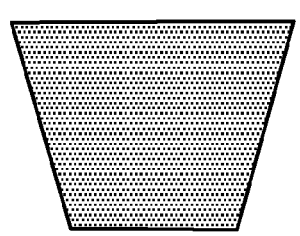
FIGS. 19A to 19I are diagrams illustrating tilt states.
Figure 19F:
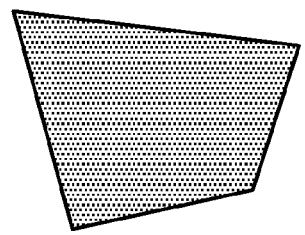
Figure 19C:
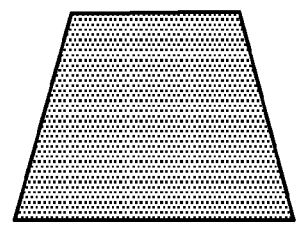
Figure 19G:
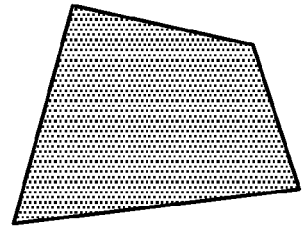
Figure 19D:
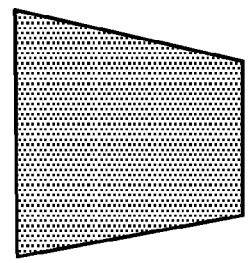
Figure 19H:
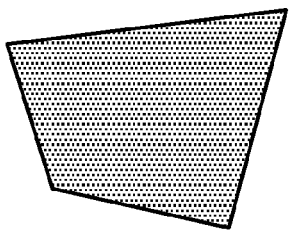
Figure 19E:
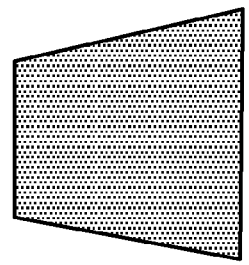
Figure 19I:
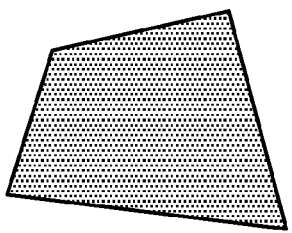
Figure 19A:
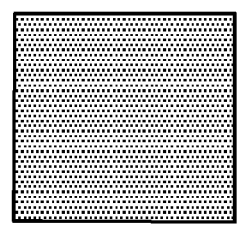

Next, the tilt state will be described with reference to FIGS. 19A to 19C. FIG. 19A shows a captured image obtained in the case where an image of a print image is captured with no tilt. In reality, the whole part of a print image is not always captured, but there are cases in which part of it is captured. However, to make the explanation simple, it is assumed here that the whole part of the print image is captured.

In the case where the captured image is tilted, the shape of the print image is like one of FIGS. 19B to 19I. However, in reality, it is difficult in many cases to determine how the tilt state is like from the captured image displayed on the display 106 of the smartphone 100. Hence, the tilt correction unit 1503 estimates the tilt state based on the distance information on area A to area D obtained by the distance-information calculation unit 1502. In the present embodiment, the tilt state is expressed using an imaginary trapezoid.

Figure 20B:
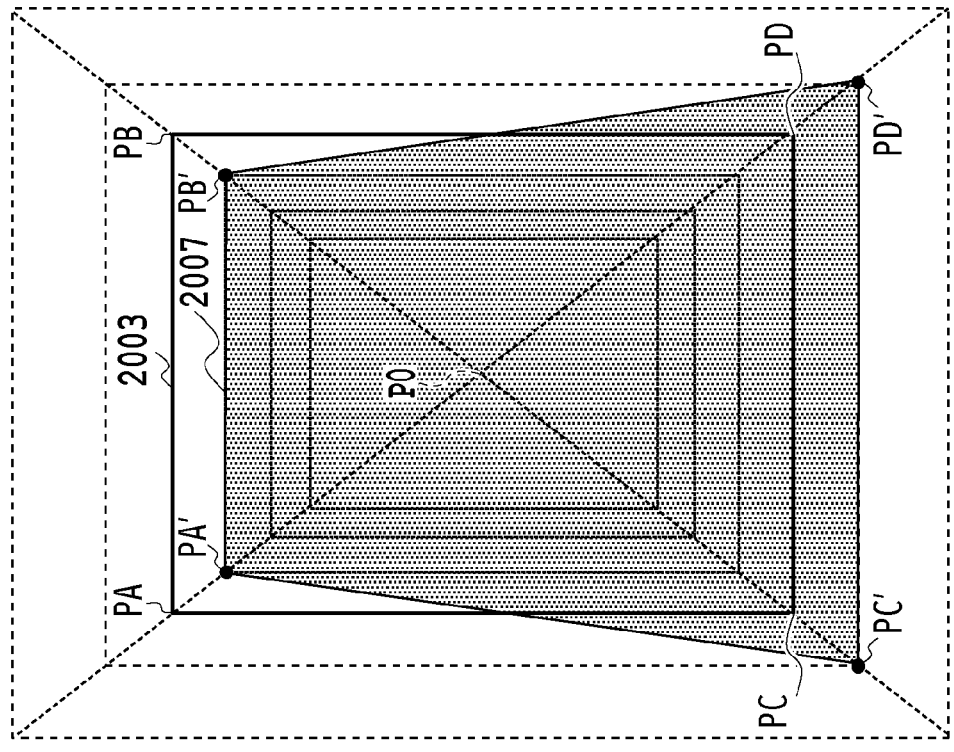
FIGS. 20A and 20B are diagrams illustrating how to calculate the shape of an imaginary trapezoid.
Figure 20A:
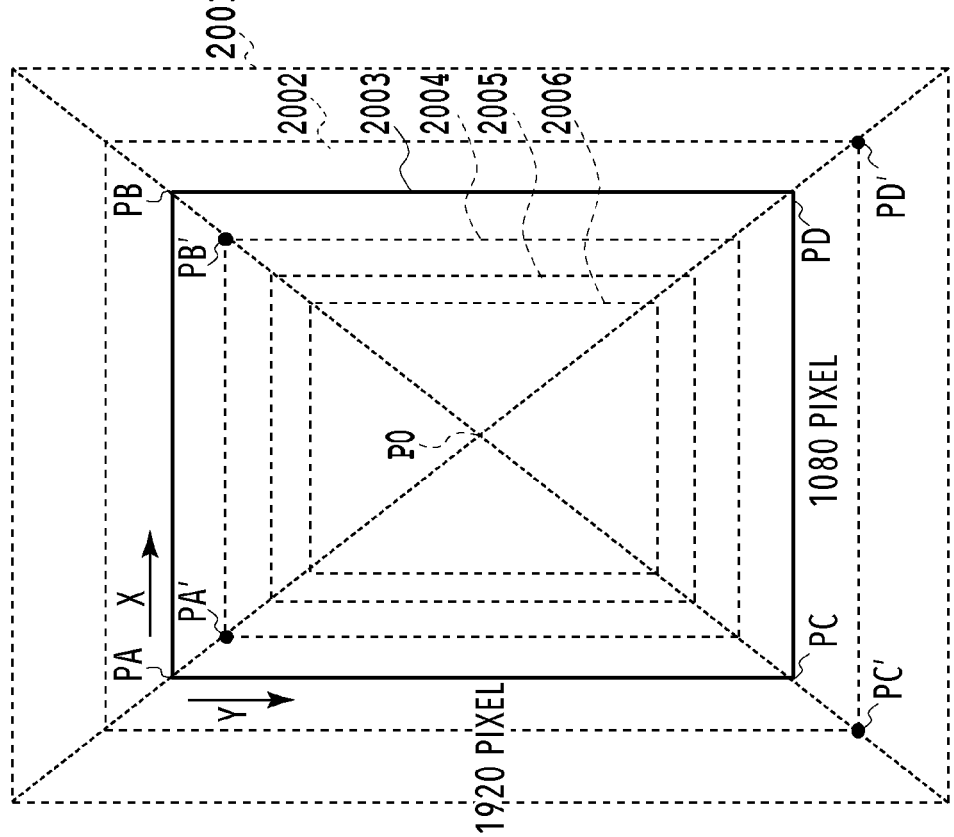

FIGS. 20A and 20B are diagrams illustrating how the shape of the imaginary trapezoid is calculated. Thick-line rectangle 2003 in FIG. 20A expresses a 1920×1080 image size obtained by the internal image-capturing device 112. Compared to this, rectangles denoted by 2001, 2002, and 2004 to 2006 express image sizes obtained by enlarging or reducing rectangle 2003. Rectangles 2001 to 2006 respectively correspond to the ring-shaped frequency areas a to f illustrated in FIG. 18B. The relative distance from the center PO to each vertex of each rectangle illustrated in FIGS. 20A and 20B corresponds to the distance (Distance) in FIG. 18C. Since ring-shaped frequency area c has a distance (Distance) of 1, ring-shaped frequency area c agrees with thick-line rectangle 2003.

Here, as an example, description will be made of a correction process performed in the case where the results of calculating distance-information on the trimming areas (areas A, B, C, and D) are 0.818, 0.818, 1.286, and 1.286, respectively. In this case, an imaginary trapezoid 2007 having the shape of the hatched portion in FIG. 20B is obtained from the estimation. Here, the printed image data is corrected such that the shape of the imaginary trapezoid 2007 changes to the shape of thick-line rectangle 2003. This correction is performed using trapezoidal correction (also called projective transformation or homography) which is commonly used to correct distortion of a rectangular image. Trapezoidal correction requires the coordinate values of four points before correction and the coordinate values of corresponding four points after correction. Next, a method of deriving the coordinate values of the eight points necessary for the trapezoidal correction will be described below.

Assume that four points after correction are the vertexes of thick-line rectangle 2003 and that the coordinate values of vertexes $PA(X_A, Y_A)$, $PB(X_B, Y_B)$, $PC(X_C, Y_C)$, and $PD(X_D, Y_D)$ are PA(0,0), PB(1080,0), PC(0,1920), and PD(1080, 1920), respectively. Note that the coordinate values used here are expressed based on the definition that the vertex PA of the image expressed by rectangle 2003 is the reference coordinates (the origin point).

The method of calculating coordinate values before correction will be described based on an example of area A. To obtain the coordinate values before correction, the XY-coordinate values $(X'_A, Y'_A)$ of vertex PA' before correction are calculated based on the center coordinates (540,960) and the coordinate values $(X_A, Y_A)$ of a vertex of rectangle 2003 after correction.

The offset $(O_X, O_Y)$ from the vertex coordinate values $(X_A, Y_A)$ after correction to the vertex $A'(X_A', Y_A')$ before correction can be expressed by the following expressions, using the center coordinates, the vertex coordinate values, and distance D.

$$O_X = (1-D) \times (540 - X_A)$$

$$O_Y = (1-D) \times (960 - Y_A) \quad \text{(Expressions 2)}$$

The coordinate values of vertex A' before correction can be expressed by the following expressions.

$$X'_A = X_A + O_X \quad \text{(Expressions 3)}$$
$$= 0 + (1 - 0.818) \times (540 - 0)$$
$$= 98.28$$

$$Y'_A = Y_A + O_Y$$
$$= 0 + (1 - 0.818) \times (960 - 0)$$
$$= 174.72$$

The coordinate values before correction of area A calculated with the above calculation expressions are rounded to the nearest integers, and (98,175) are obtained. The coordinates before correction for areas B, C, and D can be calculated using the same calculation expressions.

Then, a trapezoidal correction is performed on the image data by using the coordinate values of the four points before correction and the coordinate values of the four points after correction. In FIG. 20B, the coordinates before correction of areas C and D are positioned outside the image data expressed by rectangle 2003. Hence, for the trapezoidal correction, an image having a size larger than rectangle 2003 needs to be prepared to perform the conversion. The image size for the case is the size of rectangle 2002 in FIG. 20A. Since there is originally no image outside the image data of rectangle 2003, the outside area needs to be filled with, for example, black pixels having RGB values of (0,0,0).

After image data is obtained by performing the tilt correction process based on the trapezoidal correction, the image data after correction is transmitted to the additional-information obtaining unit 1504 (see FIG. 15).

The additional-information obtaining unit 1504 obtains the additional information from the image data (corrected image data) subjected to the tilt correction. Obtaining the additional information involves several steps. The first step is to detect the position where the additional information is embedded. Specifically, to detect the position of the embedded additional information, the spatial frequency characteristic of the image data is analyzed.

In the present embodiment, two kinds of patterns, such as FIGS. 12A and 12B or FIGS. 12C and 12D, are embedded into the print image. The embedding method employed is, for example, the method of subtracting the B components of the RGB values by 30 as illustrated in FIGS. 12A and 12B. With this method, the patterns of FIG. 12A and the patterns of FIG. 12B generate large power spectra in two specific directions. This is obvious also from FIGS. 18A and 18B. The additional-information obtaining unit 1504 detects power spectra generated in the areas of 8 px×8 px illustrated in FIGS. 12A to 12D to extract data representing "0s" and "1s". Note that pretreatment before detection may be performed such as edge detection or sharpness to enhance the power spectra.

Data extraction by frequency analysis requires analysis areas to be accurately cut out from the captured image data. In particular, in the case of image capturing using a smartphone, the image-capturing distance is not constant. Hence, it is necessary to perform a process of correcting the distance to accurately cut out the 8×8 patterns of FIGS. 12A to 12D. In the present embodiment, the tilt correction unit 1503 performs tilt correction and at the same time performs distance correction, using the results of the distance-information calculation unit 1502. Thus, the additional-information obtaining unit 1504 does not need to perform distance correction.

The next step is a process of correcting positional deviations of the coordinate positions. For example, as a possible method, a process of cutting out an area of 8 px×8 px from the print image and performing a frequency analysis on the area is repeated in the longitudinal and lateral directions while changing the position 1 px by 1 px, the process is repeated in total (8 px in the lateral direction×8 px in the longitudinal direction=) 64 times, and the position having the highest spectrum is determined to be a reference position for cutting out.

After the position detection is completed, additional information is extracted (separated). Referring to the example of FIG. 13, additional information is extracted by first detecting the marker portion 1301 of the unit block 1300 including specific binary patterns and then reading data from the data portion 1302, using the position of the marker portion 1301 as a reference. In reading, there are cases in which only part of the information can be read from one unit block. In such a case, the data may be completed by compensating for the data that could not be read with data in another unit block. Specifically, additional-information extraction may be achieved by extracting data of a first portion from a first unit block and extracting data of a second portion other than the first portion from a second unit block different from the first unit block. In the example of FIG. 13, when the data is completed, a sequence of "0s" and "1s" corresponding to 800 bits is obtained.

After separation of the additional information is completed, the data of the numerical-value string extracted as additional information is analyzed and converted into the format for the embedded additional information. For example, assume that additional information to be embedded is text document data, the character codes of which are converted into numerical values by using "Shift JIS". For 1 byte code in Shift JIS (half-width character), combinations of the upper 4 bits and the lower 4 bits are used to convert between numerical values and characters. For example, upper 4 bits "0100" and lower 4 bits "0001" are determined to be "A" as a character string. Hence, a conversion map stored in advance, associating numerical-value strings with characters enables conversion into characters.

The numerical-value string extracted as additional information is temporarily stored in the RAM 104 illustrated in FIG. 1 so as to be matched with a "Shift JIS" conversion map prestored in the secondary storage device 105.

Assume that the numerical-value string representing additional information, extracted by the additional-information obtaining unit 1504 is "0110100001100101101100011011000110111". In this case, the following is the results of matching with the conversion map.

The upper 4 bits "0110" and lower 4 bits "1000" represent the character "h".
The upper 4 bits "0110" and lower 4 bits "0101" represent the character "e".
The upper 4 bits "0110" and lower 4 bits "1100" represent the character "l".
The upper 4 bits "0110" and lower 4 bits "1100" represent the character "l".
The upper 4 bits "0110" and lower 4 bits "1111" represent the character "o".

Thus, the character string "hello" is obtained. The extracted character string, for example, is displayed on the display 106 by the display processing unit 401 in FIG. 4. In the case where an extracted character string is a URL, the smartphone 100 connects to a network and displays a screen at the URL on the display 106 using a browser. In the case where the URL is for a video-sharing site, the smartphone 100 may display the video on the display 106 and play the audio with a not-illustrated speaker. With this process, the additional-information reading process is finished.

In the present embodiment, frequency analyses are performed on multiple areas in the captured image to obtain distance information, then the distance information is used to perform a correction on the tilt that the captured image has, and additional information is read from the corrected image. Thus, even if there is a relative tilt between a print image and the image capturing device, it is possible to read additional information accurately. Also, the present embodiment is capable of obtaining the tilt state and performing correction by using additional information visually less noticeable, and thus, there is no need for printing a visible image such as a marker on the print image. Thus, the print image is not degraded in terms of quality and decorative appearance, making it possible to provide favorable image information.

Second Embodiment

Next, a second embodiment of the present disclosure will be described. Note that the present embodiment is also assumed to have the configuration illustrated in FIGS. 1 to 8B. The above first embodiment is based on an example in which the three-dimensional inclination (tilt) state that captured image data has is obtained, and based on the tilt state, the tilt correction unit 1503 of the smartphone 100 performs a tilt correction on the captured image data. In the second embodiment, unlike the first embodiment, the smartphone 100 serving as an information processing apparatus does not perform correction on an image having a tilt but performs notification control of notifying, using the display 106, the user who is operating the smartphone 100 of the tilt state. Specifically, also in the present embodiment, frequency analyses are performed on multiple areas in the captured image to obtain distance information, and the distance information is used to obtain the tilt state, as in the first embodiment. However, the captured image data is not corrected based on the tilt state. In the present embodiment, the smartphone 100 displays the current tilt state on the display 106 to prompt the user to change and adjust the orientation of the smartphone for image capturing.

Figure 21A:
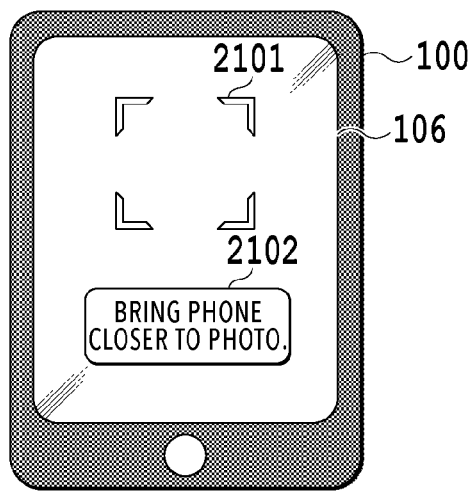
FIGS. 21A to 21E are diagrams illustrating examples of notification performed in the case where a tilt is occurring.

FIGS. 21A to 21E illustrate examples of notifications performed in the case where a tilt is occurring in reading a print image. FIG. 21A illustrates a display-screen example displayed on the display 106 of the smartphone 100 in the case where reading starts. In this case, the display 106 of the smartphone 100 is showing a reading guide 2101 and a message 2102 for the user.

Figure 21B:
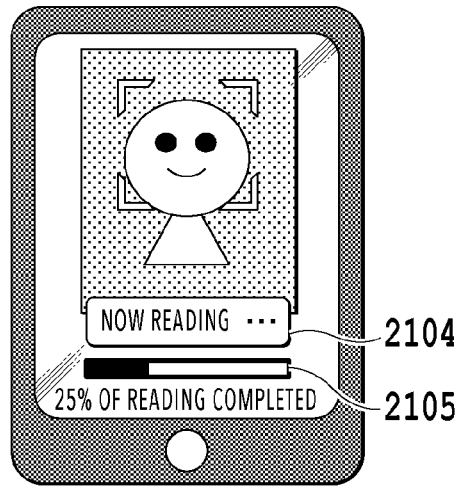

FIG. 21B illustrates a display-screen example displayed during print-image reading operation. In the illustrated example, the user is notified of the state where the captured-image reading operation is ongoing by a text message 2104 and an indicator 2105.

Figure 21C:
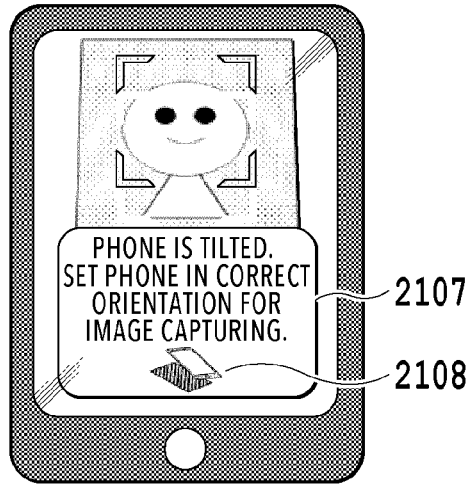

FIG. 21C is an example of a notification to the user displayed in the case where a tilt is occurring in the captured image. In this example, the display 106 shows a message 2107 saying "PHONE IS TILTED. SET PHONE IN CORRECT ORIENTATION FOR IMAGE CAPTURING." as well as an explanatory diagram 2108 indicating the tilt state. The user, notified of the occurrence of tilt by this display 106, changes the orientation of the smartphone 100 and captures an image such that the smartphone 100 faces the print image correctly, which enables correct data reading. To allow the user to visually understand the current state of the user's terminal, it is desirable to change the illustration for notifying the user according to the tilt state.

Figure 21D:
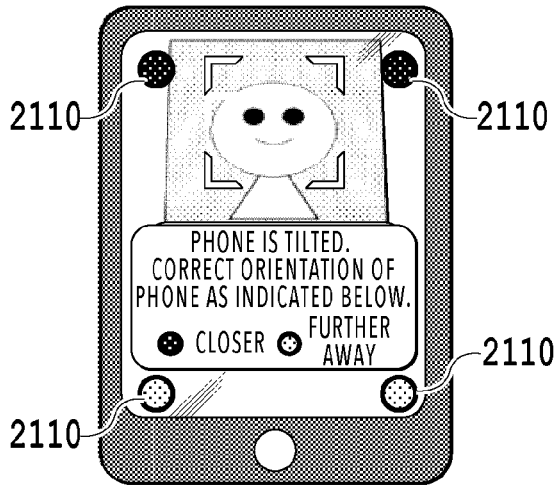
Figure 21E:
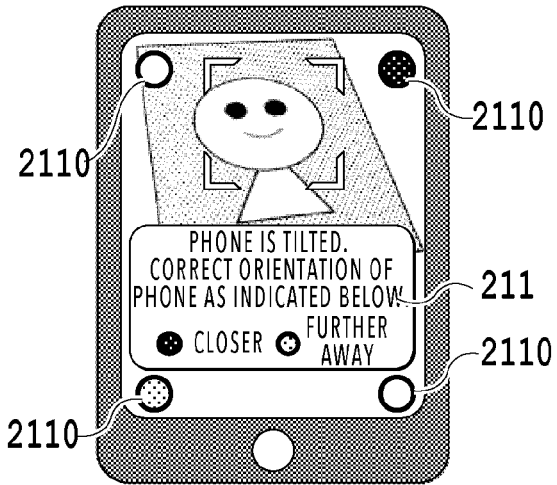

As a method for showing the current tilt state, indicators 2110 for indicating the tilt state, illustrated in FIGS. 21D and 21E may be displayed on the display screen, and the user may be notified of the tilt state by the condition displayed by the indicators 2110. In the example of FIGS. 21D and 21E, the indicators 2110 are displayed at four positions near the corners of the display 106 of the smartphone 100 and are indicating the state of the orientation of the smartphone 100. The indications of the indicators 2110 at the four points are changed according to the distances between the four points and the captured image. This makes it possible to show the user in which direction each position of the smartphone 100 should be moved to make the smartphone 100 in a correct orientation. In the example illustrated in FIG. 21D, to make the orientation of the smartphone 100 closer to the correct one, the upper side of the smartphone 100 should be moved to be closer to the print image, and the lower part should be moved in the direction away from the print image. Similarly, in the example of FIG. 21E, the upper right portion of the smartphone should be moved to be closer to the print image, and the lower left portion should be moved away from the print image, to make the orientation of the smartphone 100 closer to the correct one.

Although FIGS. 21A to 21E show an example of displaying the current tilt state on the display, the current tilt state may be indicated by an audio message.

As has been described above, the present embodiment is capable of performing frequency analyses on multiple areas in the captured image, calculating distance information indicating the distance between the captured image and the internal image-capturing device 112, then obtaining the tilt state from the distance information, and notifying the user of the obtained tilt state. Thus, even if there is a relative tilt between a print image and an image capturing device, the user can change the orientation of the smartphone 100 to the correct one based on the indication of the notification, which makes it possible to properly read additional information. In addition, since the present embodiment does not need a correction process for correcting the tilt state, the process can be simpler than in the first embodiment.

Third Embodiment

Next, a third embodiment of the present disclosure will be described. The above first embodiment was described based on an example of correcting a three-dimensional inclination (tilt) that occurs between the smartphone 100 and the print image. However, between the smartphone 100 and a print image may occur a two-dimensional inclination (rotation) along the print plane on which the image is formed. In the case where there is a two-dimensional inclination (rotation) between the smartphone 100 and a print image, a rotation occurs at the peak positions of the power spectrum illustrated in FIGS. 18A and 18B. Specifically, lines 1801 and 1802 illustrated in FIG. 18B rotate. In this case, tilt correction can be performed as in the first embodiment by detecting distances, using the ring-shaped frequency areas. However, the additional-information obtaining unit 1504 could fail in obtaining additional information.

To obtain additional information correctly, it is necessary to calculate the angle of the rotation and perform rotation correction on the captured image such that the peak positions are on the lines illustrated in FIGS. 18A to 18C. The following concretely describes a method of performing rotation correction on a captured image.

Figures 22A, 22B:
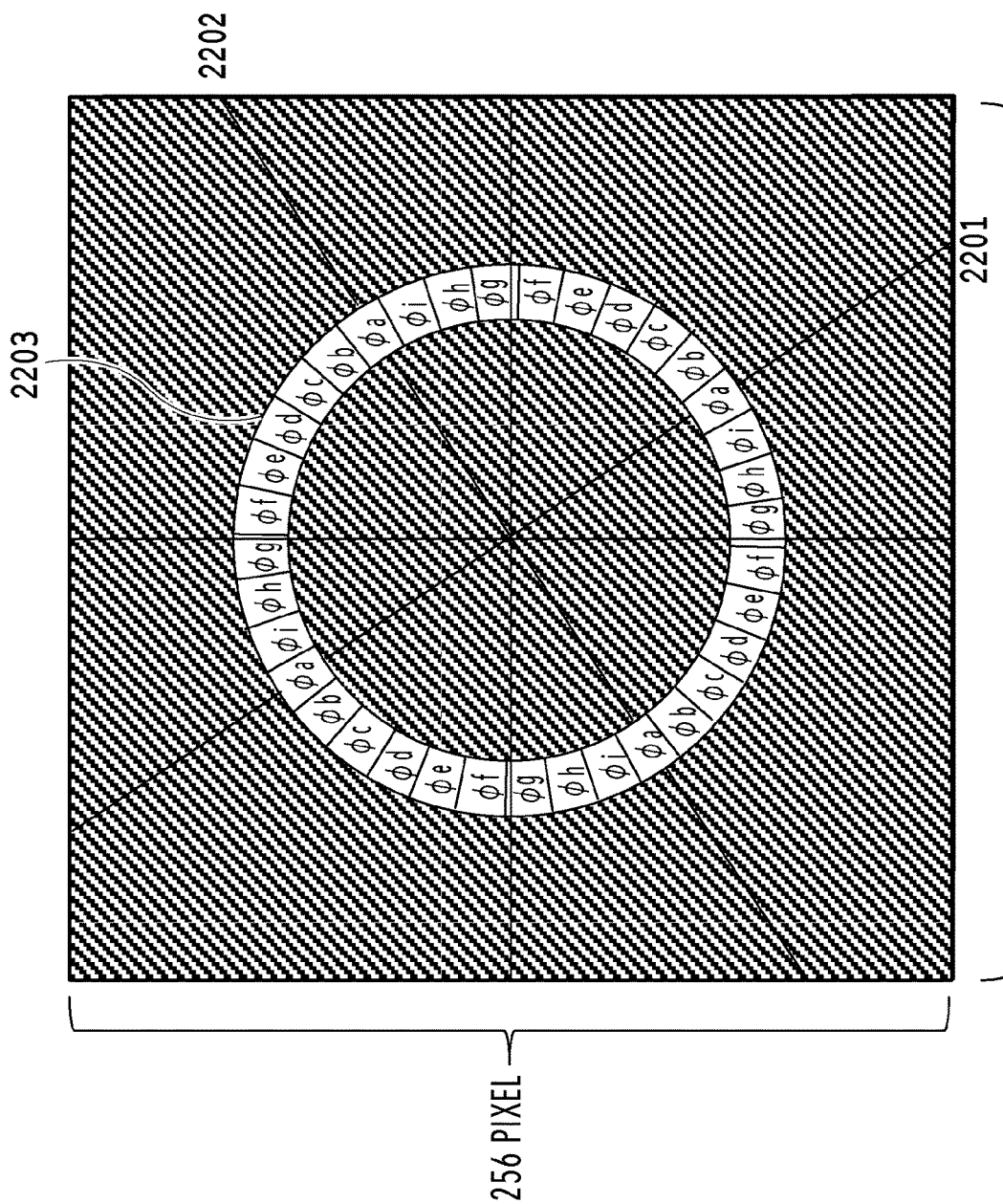
FIGS. 22A and 22B are diagrams illustrating an example of calculating rotation information.

FIGS. 22A and 22B are diagrams illustrating a rotation-information calculation example. Discussion here will be made based on a case where a peak of the power spectrum is detected in ring-shaped frequency area c in the spatial frequency domain in FIG. 18B. In this case, the ring-shaped frequency area 2203 is divided at specified angular intervals into angle areas. In the example illustrated in FIGS. 22A and 22B, the ring-shaped frequency area 2203 is divided at intervals of 10° into nine angle areas (pa to (pi, and each angle area is labeled. In this case, in the case where there is no two-dimensional inclination (rotation), four peaks of the power spectrum in the frequency area 2203 appear in the angle areas (pa. Here, lines 2201 and 2202 oriented in the directions of angle areas (pa correspond to lines 1801 and 1802 in FIGS. 18A to 18C.

Unlike this case, in the case where the print image in captured image data is angled to the left (counterclockwise) by 10°, peaks of the power spectrum appear in angle areas φb. Likewise, in the case where the print image is angled to the right (clockwise) by 30°, the peaks of the power spectrum appear in angle areas φg. The positions of the peaks of the power spectrum as described above are detected to detect two-dimensional inclination (rotation). Then, the captured image is rotated so as to correct the detected inclination. For example, since peaks in angle areas φb mean an inclination of 10° to the left, the image is rotated to the right by 10°.

Note that in the present embodiment, the frequency analyses are performed on the four trimming areas illustrated in FIG. 16. Hence, in the case where the rotation detection is performed on all the areas, each area may indicate different rotation information as the detection result, due to tilt or reading accuracy in reading. In that case, the average value on rotation information obtained for all the trimming areas may be used. Alternatively, only for rotation detection, the rotation angle obtained from only one trimming area may be used for correction.

In the present embodiment, after distance-information calculation, only the ring-shaped frequency area corresponding to the distance is used for rotation information calculation. Hence, even in the case where there is a high power spectrum outside the ring-shaped frequency area, the above method can reduce the chance of erroneous detection of rotation information caused by the influence of the information outside the frequency area.

According to the above method, it is possible to correct the inclination (rotation) from 0° to 90°. However, in this method, rotation of all the directions of 360° cannot be corrected. This is because the patterns illustrated in FIGS. 12A to 12D generate peaks at intervals of 90° in the spatial frequency domain. In order to handle all the rotation angles of 360°, a rotation of the captured image needs to be further corrected in the case where the additional-information obtaining unit 1504 obtains additional information. Specifically, in the case where image data subjected to inclination correction as described above still does not have the correct orientation, detection of the marker portion 1301 illustrated in FIG. 13 would end up being a failure in the additional-information extraction process (separation process) performed to obtain additional information. This occurs because a specific binary pattern cannot be detected in detecting the marker portion 1301. Hence, for example, image data subjected to the above inclination correction in obtaining additional information is further rotated by the four rotation angles: 0°, 90°, 180°, and 270°. Then, the rotation angle at which the specific binary pattern is detected is selected for use. This process makes it possible to perform the subsequent additional-information reading process correctly.

The reason why the captured image subjected to inclination (rotation) correction within the range of 0° to 90° is further rotated by the four rotation angles at intervals of 90° is that the patterns of FIGS. 12A to 12D generate peaks in the spatial frequency domain at intervals of 90°. For example, assume that the pattern illustrated in FIG. 12B is a pattern having the same frequency but having a wave direction that is 45° in the captured image data subjected to FFT conversion illustrated in FIGS. 18A to 18C. In this case, the angle of the peak position 1802 of the pattern is changed to 45°. Then, the positions of the four peaks in the spatial frequency domain are at intervals of 180° instead of 90°. Accordingly, in rotation information calculation, inclination (rotation) is corrected within the range of 0 to 180°, and then, in obtaining additional information, the image data subjected to the above inclination correction is rotated by the two rotation angles of 0° and 180°.

As has been described above, in the present embodiment, frequency analyses are performed on multiple areas in the captured image, distance information and inclination (rotation) information are obtained, a tilt correction is performed using the distance information and the rotation information, and a further rotation process is performed in reading additional information. Thus, even if there is a relative tilt and rotation (inclination) between a print image and an image capturing device, it is possible to read additional information properly.

OTHER EMBODIMENTS

The above embodiments are based on an example in which the same additional information is repeatedly embedded in the unit blocks over the entire surface of a print image. However, the present disclosure is not limited to this example. Each unit block may have different information embedded in it. Alternatively, the unit blocks may be classified into multiple groups. In this case, the unit blocks in a first group may have first additional information embedded in them, and the unit blocks in a second group may have second additional information, different from the first additional information, embedded in them. In addition, the unit blocks in the first group and the second group may be arranged in specified areas unevenly in the print image. Alternatively, the unit blocks in the first group and the second group may be arranged evenly. The number of such groups may be three or more.

Although in the above embodiments, the unit block into which additional information is embedded has a rectangular shape, the shape of the block is not limited to a rectangle. The unit block into which additional information is embedded may have any shape other than rectangular ones.

Alternatively, additional information may have variable length, and information on the areas where the additional information is embedded may be embedded at a specified location in data portion of the unit block (for example, at the front portion). For example, in the case of additional information of 800 bits, bits in a part of the front portion (for example, 80 bits) may indicate the area within the unit block where additional information is embedded.

Alternatively, the application 400 may have multiple sets of rules for how to embed additional information, defined in advance. Then, information for selecting a set of rules may be embedded, for example, in a header portion at the front of additional information, and additional-information extraction may be performed according to the selected set of rules.

Although the above embodiments are based on an example in which the image processing apparatus 100 and the printer 114 are connected to each other via a network, and print data generated by the image processing apparatus 100 is printed by the printer 114, the present disclosure is not limited to this example. The printer 114 may include the application 400, and the printer 114 may output a printed product having additional information embedded in it based on print data generated by the printer 114 itself. In other words, the printer 114 may include part of the function of the application 400.

The present disclosure can be implemented by a process in which a program for implementing one or more functions of the above embodiments is provided to a system or an apparatus via a network or a storage medium, and one or more processors in a computer in the system or apparatus reads and executes the program. Alternatively, the present disclosure can be implemented by a circuit (for example, an ASIC) for implementing the one or more functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-000318 filed Jan. 6, 2020, which is hereby incorporated by reference wherein in its entirety.

What is claimed is:

1. An information processing method comprising:
a first obtaining step of obtaining captured image data from an image capturing unit that captures an image of a print image in which additional information having a specified frequency characteristic is embedded;
a second obtaining step of performing a frequency analysis on partial image data of the captured image data, the partial image data corresponding to a specified area of a captured image, to obtain distance information on a distance between the area and the image capturing unit; and
a third obtaining step of obtaining inclination information indicating a state of a relative inclination between the image capturing unit and the print image, based on the distance information.

2. The information processing method according to claim 1, further comprising
a correction step of correcting the captured image data, based on the inclination information to generate corrected image data.

3. The information processing method according to claim 2, further comprising
an extraction step of extracting the additional information from the corrected image data.

4. The information processing method according to claim 2, wherein
the distance information is associated with multiple ring-shaped frequency areas set in a spatial-frequency image that is an image in a spatial frequency domain into which an image of the area is converted.

5. The information processing method according to claim 4, wherein
the distance information is information indicating a distance corresponding to a frequency area of the multiple ring-shaped frequency areas, the frequency area having the largest pixel value among pixel values in the multiple ring-shaped frequency areas.

6. The information processing method according to claim 4, further comprising
a fourth obtaining step of obtaining information on relative rotation between the image capturing unit and the print image on a print plane on which the print image is formed, wherein
the fourth obtaining step obtains first rotation information using angle areas into which the ring-shaped frequency area is divided at specified angular intervals, and
the correction step executes a rotation process along the print plane on the captured image data obtained by the image capturing unit based on the first rotation information.

7. The information processing method according to claim 6, wherein after executing the rotation process based on the first rotation information, the correction step executes another rotation process on the captured image data subjected to the rotation process, based on second rotation information different from the first rotation information.

8. The information processing method according to claim 4, wherein
the distance information is information indicating a distance corresponding to a frequency area of the multiple ring-shaped frequency areas, the frequency area having the largest average value among average values each calculated from the pixel values of each frequency area.

9. The information processing method according to claim 2, wherein
the third obtaining step obtains the inclination information, based on a difference between distance information obtained by capturing an image of the print image at a same magnification and distance information on the area, and
the correction step corrects the captured image data, based on the inclination information.

10. The information processing method according to claim 9 wherein
the second obtaining step obtains multiple pieces of distance information indicating distances between the image capturing unit and multiple areas set in the print image,
the third obtaining step obtains the inclination information, based on a difference between an average value of the multiple pieces of distance information and the distance information on each area, and
the correction step corrects the captured image data, based on the inclination information.

11. The information processing method according to claim 10, wherein
the correction step performs a trapezoidal correction on an image obtained by the image capturing unit, based on coordinate values of multiple points derived based on the distance information on each of the multiple areas.

12. The information processing method according to claim 2, wherein
the inclination information is information indicating an angle formed between the image capturing unit and a print plane on which the print image is formed.

13. The information processing method according to claim 1, wherein
the third obtaining step obtains, from distance information on the areas at positions different from each other in a longitudinal direction in the print image, a relative inclination in the longitudinal direction between the image capturing unit and the print image.

14. The information processing method according to claim 1, wherein
the third obtaining step obtains, from distance information on the areas at positions different from each other in a lateral direction in the print image, a relative inclination in the lateral direction between the image capturing unit and the print image.

15. The information processing method according to claim 1, further comprising
a notification step of performing notification of the state of the relative inclination between the image capturing unit and the print image, based on the inclination information.

16. The information processing method according to claim 15, wherein
the notification step performs the notification based on the inclination information to prompt a user to perform an operation to correct the state of the inclination.

17. An information processing apparatus comprising:
a first obtaining unit that, using an image capturing unit, captures an image of a print image in which additional information having a specified frequency characteristic is embedded, to obtain captured image data;
a second obtaining unit that performs a frequency analysis on partial image data of the captured image data, the partial image data corresponding to a specified area of a captured image, to obtain distance information on a distance between the area and the image capturing unit; and
a third obtaining unit that obtains inclination information indicating a state of a relative inclination between the image capturing unit and the print image, based on the distance information.

18. A non-transitory computer readable storage medium storing a program for causing a computer to perform an information processing method, the method comprising the steps of:
a first obtaining step of, using an image capturing unit, capturing an image of a print image in which additional information having a specified frequency characteristic is embedded, to obtain captured image data;
a second obtaining step of performing a frequency analysis on partial image data of the captured image data, the partial image data corresponding to a specified area of a captured image, to obtain distance information on a distance between the area and the image capturing unit; and
a third obtaining step of obtaining inclination information indicating a state of a relative inclination between the image capturing unit and the print image, based on the distance information.

* * * * *